(12) United States Patent
D' Jesus Bencci et al.

(10) Patent No.: US 9,565,534 B2
(45) Date of Patent: Feb. 7, 2017

(54) APPARATUS AND METHOD FOR IDENTIFYING POINT OF INTEREST IN CONTENTS SHARING SYSTEM

(71) Applicant: Samsung Electronics Co., Ltd., Suwon-si, Gyeonggi-do (KR)

(72) Inventors: German Jose D' Jesus Bencci, Staines (GB); Jim O'Reilly, Staines (GB)

(73) Assignee: Samsung Electronics Co., Ltd., Suwon-si (KR)

(*) Notice: Subject to any disclaimer, the term of this patent is extended or adjusted under 35 U.S.C. 154(b) by 322 days.

(21) Appl. No.: 13/647,848

(22) Filed: Oct. 9, 2012

(65) Prior Publication Data
US 2013/0090133 A1 Apr. 11, 2013

(30) Foreign Application Priority Data
Oct. 7, 2011 (GB) .................................. 1117422.4

(51) Int. Cl.
*H04M 1/00* (2006.01)
*H04W 4/02* (2009.01)
*H04W 4/20* (2009.01)

(52) U.S. Cl.
CPC ............ *H04W 4/028* (2013.01); *H04W 4/206* (2013.01); *H04M 2242/15* (2013.01)

(58) Field of Classification Search
None
See application file for complete search history.

(56) References Cited

U.S. PATENT DOCUMENTS

| | | | |
|---|---|---|---|
| 8,406,730 B1* | 3/2013 | English et al. | 455/404.2 |
| 2005/0075116 A1* | 4/2005 | Laird et al. | 455/456.3 |
| 2009/0147003 A1* | 6/2009 | Do et al. | 345/427 |
| 2009/0319181 A1 | 12/2009 | Khosravy et al. | |
| 2010/0002122 A1 | 1/2010 | Larson et al. | |
| 2010/0203901 A1* | 8/2010 | Dinoff et al. | 455/456.3 |
| 2010/0299757 A1* | 11/2010 | Lee | G06F 21/88 726/26 |
| 2010/0317336 A1* | 12/2010 | Ferren et al. | H04M 1/72577 455/419 |
| 2012/0052880 A1* | 3/2012 | Hymel et al. | 455/456.3 |

FOREIGN PATENT DOCUMENTS

| | | |
|---|---|---|
| EP | 2306151 A1 | 10/2010 |
| EP | 2336719 A2 | 12/2010 |
| WO | 2007132055 A1 | 11/2007 |
| WO | 2010056557 A2 | 5/2010 |
| WO | 2011068622 A1 | 6/2011 |

OTHER PUBLICATIONS

"Color Labs Offers Location-Based Photo Sharing App", Network Computing, Mar. 24, 2011.

\* cited by examiner

*Primary Examiner* — German J Viana Di Prisco
(74) *Attorney, Agent, or Firm* — Jefferson IP Law, LLP

(57) ABSTRACT

A mobile device for use in a contents sharing system is provided. The mobile device includes a communications interface configured to communicate with a location processor and to transmit activity information, relating to usage of the mobile device, and location information, relating to a location of the mobile device, to the location processor. The location information is used for identifying at least one Point Of Interest (POI).

40 Claims, 12 Drawing Sheets

APPARATUS AND METHOD FOR IDENTIFYING POINT OF INTEREST IN CONTENTS SHARING SYSTEM

PRIORITY

This application claims the benefit under 35 U.S.C. §119 (a) of a British patent application filed in the British Intellectual Property Office on Oct. 7, 2011 and assigned Serial No. GB 1117422.4, the entire disclosure of which is hereby incorporated by reference.

BACKGROUND OF THE INVENTION

1. Field of the Invention:

The present invention relates to an apparatus and a method for identifying points of interest in a contents sharing system.

2. Description of the Related Art:

In recent years there has been a large increase in the number of users carrying mobile devices that are capable of capturing and transmitting user information. Such mobile devices, such as point and shoot cameras or smart phones, can be equipped with sensors, such as Global Position System (GPS) sensors, that can be used to determine the location of the mobile device.

There is a need for systems that can aggregate user information along with location information in a meaningful way. Using a smart phone with a GPS sensor and a camera as an example, it will be appreciated that at many geographic locations, for example, popular tourist sites, users with such smart phones may record similar images at the same or similar GPS co-ordinates.

Users can then, for example, upload their pictures (or other multimedia files) to a cloud-based multimedia sharing service, and such multimedia images may be stored at the cloud based service along with GPS co-ordinates. It will be appreciated that, in many locations, there will be points of interest (e.g., a statue at a tourist site) that would be of interest to a large number of users who visit that location. If the number of users is great, such a cloud based service will store a large number of similar images with the same or similar GPS co-ordinates. Hence, it will be appreciated that location data alone provides a poor indication of what the image data relates to. As a result, there is a need for a technology that can provide better characterization of stored multimedia data.

In addition to points of interest that remain in a location for a considerable amount of time (e.g., a statue at a tourist site), there will also be transient points of interest that may only exist for a limited time. For example, a location, such as a town square, could host a concert located in one corner of the square. Such a concert would be a point of interest for the duration of the concert (e.g., one day). A cloud based image storage service would store a large number of images of this town square, and may have no way for users to identify which images are of the concert.

Therefore, a need exists for ways of identifying points of interest (either temporary points of interest or fixed points of interest) based on the activity of users. The identification of points of interest at a location or in a surrounding area is useful, both for real time sharing of information between mobile users, and for categorizing user data associated with that location.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for identifying Point Of Interest (POI) in a contents sharing system.

Another aspect of the present invention is to provide an apparatus and a method for identifying POI based on user activity in a contents sharing system.

In accordance with an aspect of the present invention, a mobile device for use in a contents sharing system is provided. The mobile device includes a communications interface configured to communicate with a location processor and to transmit, to the location processor, activity information relating to usage of the mobile device and location information relating to a location of the mobile device, wherein the location information is used for identifying at least one POI.

In accordance with another aspect of the present invention, a server for use in a contents sharing system is provided. The server includes a communications interface configured to communicate with at least one mobile device, wherein the communications interface is configured to receive at least one set of activity information relating to usage of the at least one mobile device and location information relating to a location of the at least one mobile device, and a location processor configured to determine a location of at least one POI based on the activity information and location information from the at least one mobile device.

In accordance with another aspect of the present invention, a method for using a mobile device in a contents sharing system is provided. The method includes transmitting activity information relating to usage of the mobile device and location information relating to a location of the mobile device, that are a basis for identifying at least one POI, to a location processor.

In accordance with another aspect of the present invention, a method for using a server in a contents sharing system is provided. The method includes receiving at least one set of activity information relating to usage of at least one mobile device and location information relating to a location of the at least one mobile device, and determining a location of at least one POI based on the activity information and location information from the at least one mobile device.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
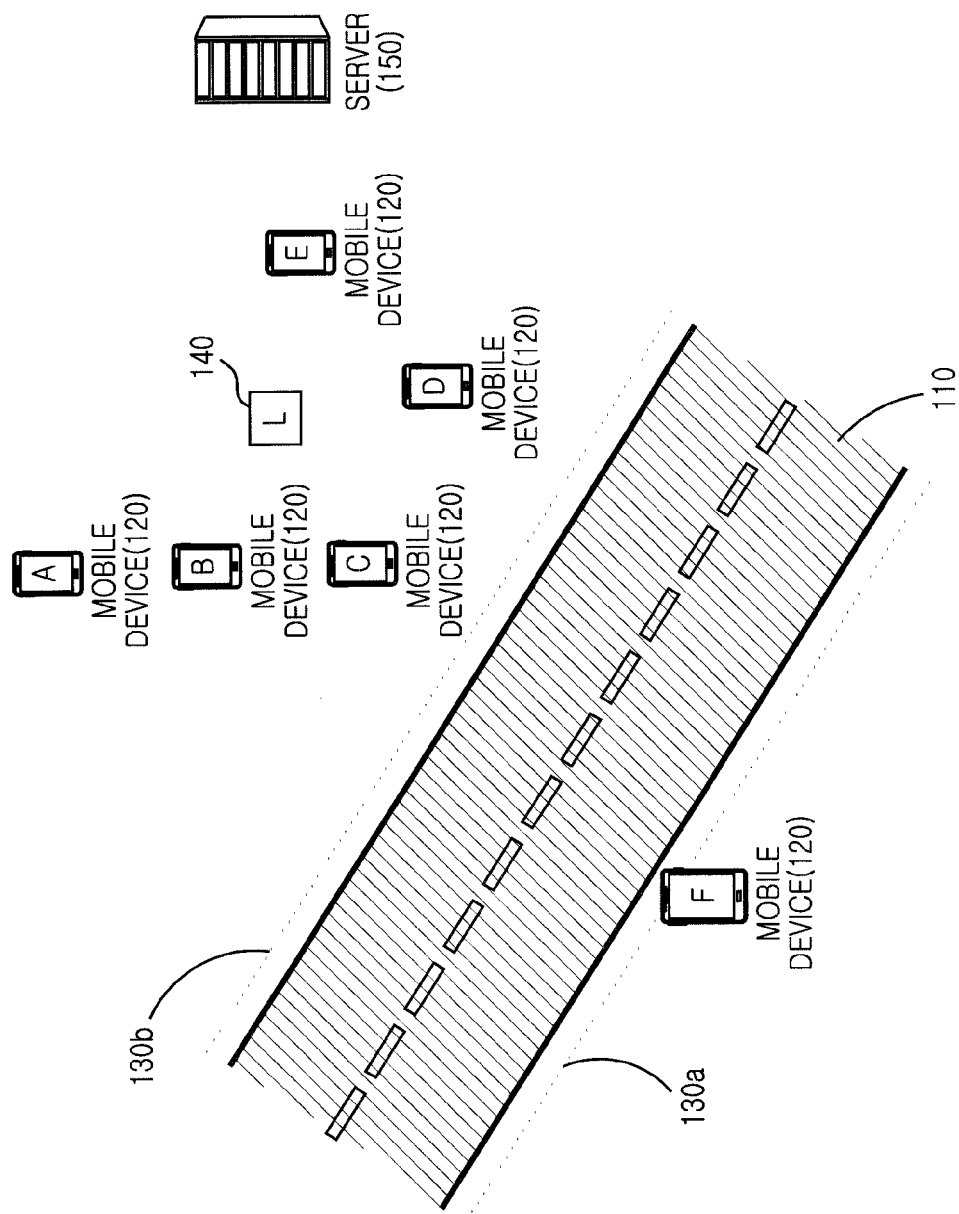
FIG. 1 illustrates a system for identifying points of interest according to a first exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The present invention relates to a system for identifying points of interest in an area based on sharing of user data.

In accordance with an exemplary embodiment of the present invention, there is provided a system for identifying points of interest. The system includes a mobile device arranged to send activity information relating to usage of the mobile device and location information relating to a location of the mobile device, a location processor arranged to receive the activity information and location information from the mobile device, wherein the location processor is arranged to use the activity information and location information from the mobile device to determine a location of at least one point of interest identified by the activity information and location information of the mobile device.

In such a system, the activity information relating to usage of the mobile device can take a number of forms, as will be described below.

By considering the activity information and the location information of the mobile device, the location processor (e.g., a server) can determine a location of at least one point of interest identified by the activity information and location information of the mobile device. Hence, the location processor can use information relating to how the mobile device is being used to establish that a location is a "point of interest".

In this context, a "point of interest" represents a location in which something of note is located (either permanently or at a point in time). The point of interest could be something of interest to any one or a combination of a user of the mobile device, something of interest to the mobile device, or something of interest to the location processor. The point of interest could relate to any location that is considered for any reason to be significant. Hence, the term "point of interest" is used in the general sense to refer to a location that is distinguishable by the system from other locations based on the activity of mobile devices in the system.

The point of interest could be a location that satisfies a predefined criteria related to the behavior of the users. In an exemplary embodiment of the present invention, a location could be determined by the system to be a point of interest when the activity information associated with one or more users matches a predefined pattern. For example, if the activity information sent by each mobile device to the location processor included image information (for example, captured by a camera or other image capture device of the mobile device), then the location processor could compare the image information sent from each mobile device and determine if there is a common subject of each image. For example, if a set number of users (e.g., 3, but it would be appreciated that the number could be chosen to suit the specific requirements of the system) take a photograph of the same object, then by a comparison of image data in the activity information, the location processor could determine that the location of that objection is a point of interest—as it is a location that is (or at least may be) of interest to at least some users of the system.

The mobile device may be arranged to send to the location processor a number of different sets of related activity information and location information at different times. In addition, the location processor may be arranged to determine the location of at least one point of interest based on the number of different sets of activity information and location information.

In an exemplary embodiment of the present invention, there could be one mobile device that sends multiple different sets of related activity information and location information at different times. These multiple different sets of related activity information and location information could be used by the location processor to determine the location of a point of interest. Hence, the system can identify a point of interest at a location based on multiple sets of data from a single mobile device. Alternatively, the system can identify a point of interest at a location based on multiple sets of data from multiple mobile devices.

The system may comprise a plurality of mobile devices, and the location processor may be arranged to use the activity information and location information from the plurality of mobile devices to determine the location of the at least one point of interest.

In an exemplary embodiment of the present invention, the location processor receives activity information and location information from a plurality of mobile devices, and uses this to determine the location of a point of interest.

The activity information may comprise time information relating to the time the mobile device was at the location associated with the location information.

For example, the location processor can use this time information in conjunction with different sets of location information to determine that something of interest is at a given location.

The location processor may be arranged to store multiple sets of activity information and location information from the mobile device, and to compare the stored activity information and location information with newly received activity information and location information from the mobile device in order to determine the location of the at least one point of interest.

In an exemplary embodiment of the present invention, multiple sets of activity information and location information from the mobile device can be stored by the location processor. This stored information can be compared to newly received activity information and location information. This comparison can be used to determine the location of a point of interest.

The location processor may be arranged to use the stored multiple sets of activity information and location information to determine a usage pattern of the mobile device in a particular location, and the location processor may be arranged to use the newly received activity information and location information to determine if the usage of the mobile device deviates from the usage pattern. The location processor may use this deviation from the usage pattern in determining the location of the at least one point of interest.

Hence, in an exemplary embodiment of the present invention, a usage pattern of the mobile device can be determined by the location processor. The location processor can analyze the newly received activity information and location information to see if it represents a deviation from the usage pattern. Such a deviation from the usage pattern of the mobile device could indicate that something of interest is occurring at the present location of the mobile device.

The usage pattern of the mobile device could relate to an expected movement path of the mobile device at the location or the surrounding area.

Hence, the location processor could determine from stored activity information and location information that in a present location, the mobile device is expected (based on its usage pattern) to move in a certain path. For example, if the mobile device is near a road at a certain time, the location processor may be able to derive, based on stored activity information and location information, that the user of that mobile device is expected to travel alongside that road. This could be, for example, because the user always takes such a path at that time of day.

Deviation from this path (i.e., representing a deviation from the expected movement path of the mobile device) could indicate that something of interest is occurring at the present location of the mobile device. The expected movement path could, of course, be determined based on stored activity information and location information corresponding to a plurality of mobile devices.

The usage pattern of the mobile device in a location could relate to other activities. Examples of usage patterns of the mobile device are any one or a combination of an expected call volume, an expected text messaging activity, an expected data usage, and the like.

Using an expected call volume as an example, if a user usually makes few or no calls at that time of day at a particular location, then an expected call volume could be derived by the location processor based on stored activity information and location information for that particular location. A large increase in call volume (derived from newly received activity information) when compared to the expected data usage value, especially if it relates to a plurality of mobile devices near one another, could indicate that something of interest is occurring at the present location.

It will be appreciated that any measurable activity of the mobile device could be logged by the location processor, and an expected value of that activity could be determined. Deviation from the normal or expected data usage value could indicate that something of interest is occurring. Hence, the usage pattern could be a normal usage pattern.

It will, of course, be appreciated that the stored "normal" or expected values of any usage parameter of the mobile device could be associated with an error margin, so that slight deviations from the expected could be ignored. This could be achieved by, for example, storing a set of "normal" paths that take into account the slight and expected route deviations a user may follow. Alternatively, thresholds could be set to determine the appropriate required level of deviation from parameters, such as an expected call volume, data usage, text messaging, and the like.

The activity information may comprise angle information that identifies an angle of orientation of the mobile device, wherein the location processor is arranged to use the angle information in determining the location of the at least one point of interest.

Angle information could be used by the location processor to determine the orientation of the mobile device at a given location. From the angle information, the position of the point of interest relative to the mobile device could be determined.

The mobile device may comprise an image capture device, and the activity information may comprise image information captured by the image capture device of the mobile device.

The image information may comprise a still photograph or a video. The mobile device may comprise capture devices for other types of media files, such as audio, notes, and the like. These other types of media files can be sent by the mobile device as part of the activity information. Hence, the location processor can build an audio and/or a picture model of the area based on collected activity information and location information.

In an exemplary embodiment of the present invention, the location processor is arranged to use the image information and angle information to determine a context space for each received set of activity information and location information, wherein each context space represents a 3 Dimensional (3D) volume associated with the image information.

In an exemplary embodiment of the present invention, the mobile device is arranged to use the image information and angle information to determine a context space for the activity information and location information, wherein each context space represents a 3D volume associated with the image information, and wherein the mobile device is arranged to send the context space to the location processor.

In an exemplary embodiment of the present invention, the "context space" represents the volume of real space that the image has captured. The context space is established by the line of sight and field of view of the image capture device of the mobile device.

Hence, the location processor can use this information to produce a collection of multi-angle and multi-location pictures of a given scene.

In an exemplary embodiment of the present invention, the location processor is arranged to determine if there is an overlap of any of the plurality of the context spaces, and to use a location of the overlap in determining the location of the at least one point of interest.

By considering the location of the overlap of context spaces, the location processor can identify a precise location of a point of interest. For example, if two users take a photograph of the same object from different vantage points, then the context spaces associated with the two photographs will overlap. By receiving activity information and location information from the two users in the way described above, this overlap in the context spaces can be determined, and hence the subject of the two photographs (i.e., the point of interest) can be determined.

Instead of simply storing the image data with the location (e.g., a Global Position System (GPS) coordinate) associated with a photograph, the location processor can further identity that the subject of the image (e.g., what is within the overlapping portion of the image's context space) is a point of interest. For example, the photograph could be tagged or annotated in some way at the location processor, to enable useful categorization of the photograph. Alternatively, the overlap of context spaces could be used in other ways, such as the generation of 3D models of a location.

The location processor may be arranged to use the plurality of context spaces to determine at least one region within a predefined location that is not covered by one of the plurality of context spaces.

When it is determined that there is at least one region within the predefined location that is not covered by one of the plurality of context spaces, the system may be arranged to send a request to a mobile device within the predefined location to obtain and send image information relating to the at least one region not covered by one of the plurality of context spaces.

In an exemplary embodiment of the present invention, the location processor can use the plurality of context spaces to identify "gaps" in its data set. The identification of gaps is useful for a number of reasons. A gap can, for example, be a barrier to completing an accurate 3D model of a location.

Alternately, a user may query the location processor (from a mobile device or otherwise) to see if it contains an image of a known point of interest at a given time. If there is no image of a known point of interest at a given time, there will be no context space including the location of that known point of interest at that time. Thereafter, the system can request that a mobile device sends activity information corresponding to that known point of interest. Hence, the system can request that users upload appropriate data relating to past points of interest.

If it is desired to establish a context space for past points of interest, the mobile device could send image data, angle data, time data, and location data to the location processor, which could use it to determine the relevant context space, and hence, the appropriate representation of the known point of interest. Alternatively, the user of the mobile device could respond to the request and go and take an appropriate photograph at some time in the future.

The mobile device may be arranged to receive a user input indicating that the user considers something of interest at their location, and the activity information may comprise an indication that the user has made such a user input.

The activity information could comprise any form of multimedia information (e.g., video or sound data) captured by the mobile device.

Hence, when sending location information to the location processor, the activity information could comprise, either alone or in combination with any one of the other forms of activity information discussed herein, an indication that the user considers the present location to be a point of interest. For example, the user could be taking a photograph of an object that the user knows is unusual and of interest to others. Such information could be used to help the location processor in determining a point of interest.

The mobile device may further comprise a sensor arranged to detect a change in behavior or physiology of the user, and the activity information could comprise an indication that there has been a behavioral or physiological change of the user at that location.

Hence, when sending location information to the location processor, the activity information could comprise, either alone or in combination with any one of the other forms of activity information discussed herein, an indication that there has been a behavioral or physiological change of the user at that location. For example, the user could be taking a photograph and the mobile device could detect an elevated heart rate. Such information could be used to help the location processor in determining a point of interest.

Alternatively, the sensor could be arranged to detect a behavioral or physiological parameter of the user, with this forming at least part of the activity information. The location processor could determine if there was a change, based on previous data.

The mobile device may further comprise a sensor arranged to detect an environmental change at the location of the mobile device, and the activity information may comprise an indication that there has been an environmental change at the location of the mobile device.

Hence, when sending location information to the location processor, the activity information could comprise, either alone or in combination with any one of the other forms of activity information discussed herein, an indication that there has been an environmental change of the user at that location. For example, the mobile device may include a sensor that indicates that there has been an accident (e.g., an automatic distress signal included in a car). Such information may be used to help the location processor in determining a point of interest.

Alternatively, the sensor may be arranged to detect an environmental parameter, which forms at least part of the activity information. The location processor may determine if there was a change, based on previous data.

In an exemplary embodiment of the present invention, a first mobile device is arranged to determine that there are other mobile devices in its surrounding area, and wherein the activity information comprises an indication that there are a plurality of users at the location.

In an exemplary embodiment of the present invention, one of the mobile devices present in the system determines that there are other mobile devices in its surrounding area. This could be done in a number of different ways, for example, by the mobile devices in the surrounding area sharing appropriate identification signals. The activity information may comprise, either alone or in combination with any one of the other forms of activity information discussed herein, an indication that there are a plurality of users at the location.

The mobile device may be arranged to store multiple sets of activity information and location information associated with different times to determine a usage pattern of the mobile device at the location, wherein the mobile device is arranged to use newly obtained activity information and location information to determine if the usage of the mobile device deviates from the normal usage pattern. The activity information includes an indication that the mobile device has deviated from the normal usage pattern.

Hence, in an exemplary embodiment of the present invention, a usage pattern of the mobile device can be determined by the mobile device. The activity information can include an indication that the mobile device has deviated from the usage pattern, and this can be used by the location processor. Such a deviation from the normal usage pattern of the mobile device could indicate that something of interest is occurring at the present location of the mobile device.

In an exemplary embodiment of the present invention, the mobile device may be arranged to send the activity information to the location processor only when the mobile device has deviated from the usage pattern.

It will be appreciated that any measurable activity of the mobile device could be logged by the mobile device, and an expected value of that activity could be determined (e.g., within an error margin). Deviation from the normal or expected data usage value could indicate that something of interest is occurring. Hence, the usage pattern could be a normal usage pattern.

In an exemplary implementation, the deviation from the usage pattern acts as a trigger for the sending of the activity information. The activity information could include data relating to the usage that deviated from the usage pattern or could include (or even consist of) an indication that there has been a deviation from the usage pattern.

In an exemplary embodiment of the present invention, the mobile device may be arranged to send the activity information and location information as a result of a user action. In other words, an active step by the user (e.g., taking a photograph, making a call, pressing a button, and the like) could trigger the mobile device to send the activity information and location information to the location processor.

In an exemplary embodiment of the present invention, the mobile device may be arranged to send the activity information and location information as a result of a determination by the mobile device. This determination may be made by the mobile device when the usage of the mobile device deviates from the usage pattern.

In other words, the trigger for the mobile device to send the activity information and location information to the location processor could be made by the mobile device in the absence of an active user step (for example, the deviation from a usage pattern of the mobile device).

In an exemplary implementation, the mobile device is arranged to determine whether the activity information relates to usage of the mobile device that satisfies a predefined condition. In addition, the mobile device is arranged to send the activity information to the location processor when the usage of the mobile device satisfies the predefined condition. The predefined condition may relate to a usage level of one of more functions of the mobile device.

Hence, in an exemplary embodiment of the present invention, the mobile device can store information relating to a predefined condition relating to usage of the mobile device. This information could relate to any one or a combination of usages of the different functions of the mobile device.

For example, the predefined condition could be triggered by a combination of taking a photograph on the mobile device and sending the photograph by email (or to a service, such as a social networking site). The mobile device could determine that the user has taken a photograph and immediately sent the photograph, triggering a determination that the current location of the mobile device may be associated with a point of interest.

When the predefined condition is satisfied, the mobile device could send location information and activity information. Alternatively, the trigger may just be for the activity information, with the location information being sent as the result of another criteria (e.g., continuously polled).

In an exemplary embodiment of the present invention, the predefined condition may comprise a use of a function of the mobile device. For example, the predefined condition may comprise any one or a combination of use of an image capture device of the mobile device, use of a telephone call function of the mobile device, use of a text messaging function of the mobile device, use of a Multimedia Messaging Service (MMS) messaging of the device, accessing a predefined internet service by the mobile device, and the like. It will be appreciated that mobile devices have potentially many functions, and the use of any function of the mobile device could be used entirely or as part of the predefined criteria.

In an exemplary embodiment of the present invention, the predefined condition may comprise information relating to the movement of the mobile device. For example, the predefined condition could be satisfied by the mobile device coming to a halt (e.g., in combination with another usage of the mobile device).

Hence, in an exemplary embodiment of the present invention, the activity information will be sent to the location processor when usage of the mobile device matches the predefined criteria.

As discussed, the activity information can itself take many forms, and the predefined criteria can relate to any one or a combination of parameters that could form the activity information.

Furthermore, the usage of the mobile device that satisfies the predefined criteria need not necessarily be sent as part of the activity information. For example, if the predefined criteria were satisfied by the mobile device capturing an image and coming to a halt, the activity information could comprise the image data but not information indicating that the mobile device came to a halt.

In an exemplary embodiment of the present invention, the mobile device may comprise a sensor arranged to detect a behavioral or physiological parameter of the user, and the predefined criteria may be satisfied based on a level of such a behavioral or physiological parameter of the user at that location. Hence, a change in the behavior or physiology of the user could (in whole or in part) trigger the satisfaction of the predefined criteria.

In an exemplary embodiment of the present invention, the mobile device may comprise a sensor arranged to detect an environmental parameter at the location of the mobile device, and the predefined criteria may be satisfied based on an environmental parameter at the location of the mobile device. Hence, an environmental change could (in whole or in part) trigger the satisfaction of the predefined criteria.

In an exemplary embodiment of the present invention, the predefined criteria may be satisfied based on the presence of a plurality of users at the location. Hence, the presence of a group of users could (in whole or in part) trigger the satisfaction of the predefined criteria.

In an exemplary embodiment of the present invention, the activity information may comprise an indication that the predefined criteria has been satisfied. Such an indication in the activity information could be used by the location processor to help determine the location of a point of interest.

For example, if the predefined criteria were sufficient, the location processor could rely on the determination by the mobile device that the predefined criteria has been satisfied, and hence determine that the current location of the mobile device is a point of interest. Accordingly, the use of such predefined criteria on the mobile device can reduce the amount of processing required at the location processor.

Furthermore, in an exemplary embodiment of the present invention, the activity information could consist of an indication that the mobile device has determined that the predefined criteria has been satisfied.

The location processor may be arranged to send information relating to the predefined condition to the mobile device.

The location processor may be arranged to send information relating to the at least one point of interest to the mobile device.

In an exemplary implementation, one of the mobile devices in the system comprises the location processor.

In an exemplary implementation, one of the mobile devices in the system may act as the "server" for the other mobile devices.

In an exemplary implementation, the location processor is arranged to send information relating to the at least one point of interest to a remote server.

Hence, in an exemplary embodiment in which one of the mobile devices in the system may act as the "server" for the other mobile devices, that mobile device can further send information relating to the at least one point of interest to a remote server. In this case, the activity information can be exchanged between the mobile devices located within a predefined area. Each mobile device can aggregate the information received so far, and let other mobile devices continue the aggregation.

In an exemplary embodiment of the present invention, the system comprises a server remote from the mobile device, the server comprising the location processor.

In an exemplary embodiment of the present invention, the location processor is arranged to tag the activity information with an indication that it is associated with the determined point of interest.

Hence, the activity information stored at the location processor can be tagged to indicate that it is associated with the determined point of interest. The tag could take a number of forms and could enable the effective categorization of activity information stored at the location processor.

The tag information from the different pictures taken can be used to create 3D images, as nearby images that are taken with nearly identical tag information in a nearly simultaneous time and location are linked together to build 3D images. The creation of 3D images can be utilized to create a 3D representation of a specific environment/location that is outdoors and indoors. The 3D representation of the location may be provided to users in the specific location to highlight the live details of the imaging traffic in different areas.

It will be appreciated that other ways of presenting the totality of images/videos from a predefined location are possible. For example, the representation could take the form of a spiral which goes back in time, wherein the further back in time, the smaller the image representation appears. This could be located across the different points of interest, the rotation will provide different angles of the taken images. Alternatively, such a spiral could be used for the different users taking the pictures in substantially the same location and another bar will modify the complete representation in a different time.

According to an exemplary embodiment of the present invention, there is provided a mobile device for use in a system for identifying points of interest. The mobile device may include a communications interface adapted to communicate with a remote location processor, wherein the communications interface is adapted to send activity information relating to usage of the mobile device and location information relating to a location of the mobile device to the location processor.

According to an exemplary embodiment of the present invention, there is provided a server for use in a system for identifying points of interest. The server may include a communications interface adapted to communicate with at least one mobile device, wherein the communications interface is adapted to receive activity information relating to usage of the mobile device and location information relating to a location of the mobile device, and a location processor arranged to determine a location of at least one point of interest identified by the activity information and location information of the mobile device.

FIGS. 1 through 6C, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 illustrates a system for identifying points of interest according to a first exemplary embodiment of the present invention.

Referring to FIG. 1, a schematic representation of a portion of a road 110 and a plurality of mobile devices 120 is illustrated. A plurality of users A through F are shown. In this exemplary embodiment, each of users A through F carries a mobile device 120.

In an exemplary embodiment of the present invention, each of the mobile devices 120 may be a portable electronic device that includes one of a smart phone, a portable terminal, a mobile phone, a mobile pad, a media player, a tablet computer, a handheld computer, a Personal Digital Assistant (PDA), and the like. Furthermore, the mobile devices 120 may be a combination of at least two of the aforementioned devices.

The portion of the road 110 is generally straight, and for the sake of this example, it is assumed that under normal circumstances, each user takes a substantially straight path along one of the sides of the road 110 (e.g., along path 130*a* or 130*b*). For example, user F has a mobile device 120 and is shown walking along path 130*a*.

Users A through E are shown having deviated from the path 130*b*. In the illustrated example, users A through E have formed an arc around a location L 140 of a point of interest. The point of interest at location L 140 could be anything that is of interest to users A through E at this time. For example, it could be a temporary art display, an accident of some kind, and the like.

In the illustrated example, each of the mobile devices 120 used by users A through F is in wireless communication with a server 150 using a Global System for Mobile Communications (GSM) system. GSM is well known and accordingly will not be described further. Furthermore, it will be appreciated that each of the mobile devices 120 could be in communication with the server 150 by any means of the related art, the details of which will not be described further.

The server 150 collects activity information relating to usage of each mobile device 120 and location information relating to a location of the mobile device 120. This information is sent by each mobile device 120 and enables the server 150 to build up a representation of the usage patterns of users in this region of road 110.

"Normal" usage could involve users walking along either path 130a or path 130b along the sides of the road. Hence, the server 150 could establish that path 130a or path 130b represents the expected movement path of each mobile device 120 based on received data relating to the locations of mobile device 120 at different times. The expected movement path could, of course, be determined based on stored data corresponding to a plurality of the mobile devices 120. In other words, the server 150 could build a model of movement of the mobile device 120 in the region of this road 110, and could establish what movement pattern is considered normal. In general, path 130a and path 130b represent usage patterns of the mobile device 120 that could be determined by the server 150.

Therefore, the activity information and location information of each mobile device 120 could comprise information that enables the server 150 to establish that each device normally takes either path 130a or 130b in this region of the road 110. Multiple sets of this activity information and location information could be sent to the server 150 by each mobile device 120 to enable the server 150 to determine this usage pattern.

Furthermore, the mobile device 120 of the users in this region of the road 110 could transmit to the server 150 information regarding their location and the activity relating to other uses of the mobile device 120. As a result, the server 150 could establish a usage pattern of each mobile device relating to other activities of the mobile device 120, besides movement.

For example, the region of the road 110 at a given time could be associated with an expected call volume, an expected text messaging activity, an expected data usage or otherwise, and the like. These expected levels of activity of the various functions of the mobile device 120 could be determined based on repeated measurements, and could form all or part of the usage pattern of each device. There are a number of ways that the server 150 could obtain this information, the simplest being for the mobile device 120 to communicate with the server 150 a log of activity in conjunction with location. The server could store such information in an appropriate database for the purpose of determining average usage patterns.

It will be appreciated that the server 150 could establish an expected level of activity of any function of the mobile device 120.

Referring to FIG. 1, the point of interest at location L 140 is new in that it does not correspond to information previously held in the server 150.

It will be appreciated that the server 150 could determine that there is something of interest at the location L 140 as a result of the unusual usage patterns of the mobile device 120 of users A through E, based on any one or a combination of a number of different criteria.

Users A through E have deviated from the normal path 130b and have formed an arc around the location L 140 of the point of interest. Hence, the deviation of users A through E from their expected movement path (i.e., path 130b) could be used by the server 150 to determine that something of note may be occurring at the users' locations.

In addition, a spike in usage of one of the functions of the mobile device 120 of users A through E above normal levels, could alert the server 150 to something of interest being present at location L 140.

Furthermore, the arc-like pattern of the mobile device 120 of users A through E alone could be used by the server 150 to determine that something of interesting is occurring at location L 140. This arc-like pattern provides an indication that something of interest is at the center point of the arc. This is because the server 150 could identify the pattern of the location of users A through E, and use this to determine that the point of interest is at location L 140, which is the center point of the arc-like pattern of the mobile device 120 of users A through E, rather than (for example) on the road. In other words, by receiving information about the location of the users A through E and considering both the absolute location of the users A through E (e.g., their GPS coordinates) and the relative location of the users A through E (i.e., the arc-like pattern), the server 150 could accurately estimate the location L 140 of the point of interest.

In addition, the arc-like pattern of the mobile devices 120 of users A through E could be used in conjunction with other data to determine the location of the point of interest more accurately.

Hence, based on the receipt of activity information (in a number of possible forms) and location information of the mobile devices 120 of users A through E, the server 150 could establish that at that time, something of interest is present at location L 140.

The activity information sent by users A through E could take a number of forms. For example, if the server 150 had previously built up a picture of usage of functions of the mobile device 120 in the stretch of the road 110 (e.g., a normal call frequency, a normal text message frequency, a normal data usage, and the like), a large spike in any of these functions (i.e., a call volume, a text messaging volume, data usage, and the like) could imply that something of interest is happening at this time for users A through E.

In other words, while it might not be unusual for a single user to take a call in the stretch of the road 110, if each of users A through E all initiated a call at a very similar time, whilst assuming the arc-like shape shown in FIG. 1, the server 150 could use this to determine that something of interest was happening at location L 140 based on the activity of users A through E and their locations (both absolute and relative to each other).

Hence, the server 150 could determine from the activity of users A through E that something of interest was occurring, even if the server 150 did not store anything from the users A through E, except a log of activity and location information. In other words, a deviation from previously stored usage patterns could alert the server 150 that something of interest is occurring, with the location of the users A through E (both absolute and/or relative to each other) being used to determine the point of interest.

Furthermore, it would be appreciated that the activity information sent by the mobile device 120 of users A through E could include other information useful for the server in determining that location L 140 contains a point of interest. For example, the mobile device 120 could be equipped with an angle sensor (e.g., a gyroscope, a light sensor, and the like), and angle information could be sent to the server 150.

For example, it would be possible to determine that the user of a mobile device 120 is sending a text message, and from appropriate angle information, it could be estimated which direction the device is pointing. Given that the large majority of users would input a text message with their mobile device 120 in front of them, and hence pointing in a forward direction, this would enable the server 150 to determine where the users are looking as they typed their text messages.

For example, unlike the sole use of GPS coordinates, a spike of text messages, each associated with angle data, could alert the server 150 that there is a point of interest, and enable the server 150 to more accurately determine the location of the point of interest.

It will be appreciated that angle data could be associated with a large number of possible usages of the mobile device, to enable the server 150 to build up a more accurate picture of the location of the point of interest. For example, users typically make calls with a mobile device either at their left or right ear. Accordingly, it is possible to determine (if the user's preference for left or right ear is known) which direction a user is facing when they are making a call. In other words, with a user whose preference it is to take a call at their left ear, the angle information could be used to determine which direction the user is facing.

In addition, the activity information used by the server 150 may receive a form of an indication from the users A through E that something interesting is happening. For example, the mobile device 120 of each user A through E could be provided with a way of sending a message to the server that something of interest is happening. More particularly, the mobile device 120 could be provided with an appropriate user input (i.e., either software or hardware) that indicates that something of interest is occurring. Such information, in conjunction with the location of users A through E, could enable the server 150 to determine the location L 140 of a point of interest.

Furthermore, the mobile device 120 could itself send an indication to the server 150 that something interesting is happening, without input from the user. For example, the mobile device 120 could be equipped with a heart rate sensor that measures the heart rate of its user. A spike in heart rate could be associated with something of interest happening nearby. A rise in heart rate of users A through E, at the location L 140 shown in FIG. 1, could be used by the server 150 to determine that something of interest is happening at location L 140.

In other words, the mobile device 120 could be equipped with a sensor arranged to detect a change in behavior or physiology of the user. In such a case, the activity information sent by the mobile device 120 could comprise an indication that there has been a behavioral or physiological change of the user at that location. Alternatively, the sensor could be arranged to detect a behavioral or physiological parameter of the user, with this forming at least part of the activity information. The server 150 could determine whether there was a change, based on previous data.

The mobile device 120 may further comprise a sensor arranged to detect an environmental change at the location of the mobile device, and the activity information may comprise an indication that there has been an environmental change at the location of the mobile device. For example, the mobile device could include a sensor that indicates that there has been an accident (e.g., an automatic distress signal included in a car). Such information could be used to help the server 150 in determining the location of a point of interest. Alternatively, the sensor could be arranged to detect an environmental parameter, with this forming at least part of the activity information. Accordingly, the server 150 could determine if there was a change, based on previous data.

Furthermore, the mobile device 120 of each user A through E could determine that the mobile device 120 has deviated from the expected routine. For example, the mobile device 120 could be aware that it would routinely be expected to follow path 130b of that side of the road 110 at that time, but a deviation from this routine could trigger the sending of activity information and location information to the server 150. The receipt of a number of such set of activity information and location information from users A through E, could enable the server 150 to determine that something of interest is happening at location L 140 as discussed above.

In other words, the mobile device 120 of each user A through E could store multiple sets of activity information and location information associated with different times to determine a usage pattern of the mobile device at the location. The activity information sent to the server 150 could include an indication that the mobile device has deviated from the usage pattern.

In addition, the mobile device 120 of each user A through E could be arranged to determine whether the activity information relates to usage of the mobile device that satisfies a predefined condition. For example, the predefined condition could relate to a usage level of one or more functions of the mobile device 120. In such a case, the mobile device could be arranged to send the activity information to the server 150 when the usage of the mobile device satisfies the predefined condition.

Accordingly, usage of the mobile device 120 that satisfies the predefined condition could trigger the mobile device sending the activity information to the server 150. The predefined condition could relate to any one or a combination of usages of the different functions of the mobile device. For example, the predefined condition could be triggered by a combination of taking a photograph on the mobile device 120 and sending the photograph by email (or to a service, such as a social networking site). The mobile device 120 could determine that the user has taken a photograph and immediately sent the photograph, triggering a determination that the current location of the mobile device 120 may be associated with a point of interest. This information could be used by the server 150.

When the predefined condition is satisfied, the mobile device 120 could send location and activity information. Alternatively, the trigger may be just for the activity information, with the location information being sent as a result of another criteria (e.g., continuously polled).

In an exemplary implementation, the predefined condition may comprise a use of a function of the mobile device 120. For example, the predefined condition may comprise any one or a combination of use of an image capture device of the mobile device 120, use of a telephone call function of the mobile device 120, use of a text messaging function of the mobile device 120, use of an MMS messaging function of the mobile device 120, accessing a predefined internet service by the mobile device 120, and the like.

It will be appreciated that such mobile device 120 (e.g., a smartphone) potentially has many functions, and the use of any function of the mobile device 120 could be used entirely or as part of the predefined criteria.

In an exemplary implementation, the predefined condition may comprise information relating to the movement of the mobile device 120. For example, the predefined condition could be satisfied by the mobile device 120 coming to a halt (e.g., in combination with another usage of the mobile device 120).

Hence, in such exemplary embodiments of the present invention, the activity information will be sent to the server 150 when usage of the mobile device 120 matches the predefined criteria.

As discussed, the activity information can itself take many forms, and the predefined criteria can relate to any one or a combination of parameters that could form the activity information.

Furthermore, the usage of the mobile device 120 that satisfies the predefined criteria need not necessarily be sent as part of the activity information. For example, if the predefined criteria were satisfied by the mobile device 120 capturing an image and coming to a halt, the activity information could comprise the image data but not information indicating that the mobile device 120 came to a halt.

In an exemplary implementation, the mobile device 120 may comprise a sensor arranged to detect a behavioral or physiological parameter of the user, and the predefined criteria may be satisfied based on a level of such a behavioral or physiological parameter of the user at that location. Hence, a change in the behavior or physiology of the user could (in whole or in part) trigger the satisfaction of the predefined criteria.

In an exemplary implementation, the mobile device 120 may comprise a sensor arranged to detect an environmental parameter at the location of the mobile device 120, and the predefined criteria may be satisfied based on an environmental parameter at the location of the mobile device 120. Hence, an environmental change could (in whole or in part) trigger the satisfaction of the predefined criteria.

In an exemplary implementation, the predefined criteria may be satisfied based on the presence of a plurality of users at the location. Hence, the presence of a group of users could (in whole or in part) trigger the satisfaction of the predefined criteria.

In an exemplary implementation, the activity information may comprise an indication that the predefined criteria has been satisfied. Such an indication in the activity information could be used by the server 150 to help determine the location of a point of interest.

For example, if the predefined criteria were sufficient, the server 150 could rely on the determination by the mobile device 120 that the predefined criteria has been satisfied and determine that the current location of the mobile device 120 is a point of interest. Hence, the use of such predefined criteria on the mobile device 120 can reduce the amount of processing required at the server 150.

Furthermore, in an exemplary implementation, the activity information could consist of an indication that the mobile device 120 has determined that the predefined criteria has been satisfied.

The server 150 could, for example, send information relating to the predefined condition to the mobile device 120.

Furthermore, the mobile devices 120 of users A through E could recognize among themselves that they have formed a group around location L 140. In other words, the mobile devices 120 of users A through E could collectively recognize that something interesting is occurring (for example, based on deviation from the expected routine, spike in usage activity, heart rate sensors, the simple fact that a group of similar devices are nearby, and the like) at location L 140. This information could be collated and sent to the server 150, or sent by individual mobile devices 120 to the server 150 for collation.

Hence, a mobile device 120 could be arranged to determine that there are other similar mobile devices in its surrounding area. In such a case, the activity information sent by the mobile device 120 could comprise an indication that there are a plurality of users at the location.

In an exemplary implementation, the mobile device 120 determining that there are other mobile devices in its surrounding area and using this as part of the activity information may rely on wireless communication between each of the mobile devices 120. This communication could be the establishment of an ad hoc network or could be something more simple, such as a mobile device 120 receiving a signal broadcast by a nearby mobile device 120 that indicates that the nearby mobile device 120 considers that something of interest is occurring.

Based on the above, the exemplary embodiments of FIG. 1 illustrate a schematic representation of a system for identifying points of interest. More particularly, the system comprises at least one mobile device 120 that is arranged to send activity information relating to usage of the mobile device 120 and location information relating to a location of the mobile device 120 to the server 150. The server 150 acts as a location processor that receives the activity information and location information from the mobile device 120, and uses the activity information and location information from the mobile device 120 to determine the location L 140 of a point of interest.

The activity information could be sent by each user A through E, and could be triggered by an active user action, such as:
  pressing an appropriate hardware or software button,
  taking a photo,
  recording a multimedia file (e.g., video or sound),
  making a call, and
  sending a text message.

Alternatively, the activity information could be sent as a result of a determination by the mobile device 120 in the absence of a user input, for example, as a result of:
  deviation from a stored usage pattern of the device,
  information from an appropriate sensor,
  determination that usage of the device satisfies a predefined condition (i.e., a predefined trigger), and
  determination that the device has formed part of a group with a common interest.

In addition, any of these activities (i.e., with or without a user input) could form the whole or part of predefined criteria stored on the mobile device 120. Hence, when one or a combination of these activities satisfies the predefined criteria, the mobile device 120 can send the activity information (which might simply be an indication that the predefined criteria has been satisfied, or could include information relating to one or more of the activities) to the server 150.

Furthermore, the activity information could be sent by one of the mobile devices 120 on behalf of a group of nearby mobile device 120. For example, each of the mobile devices 120 of users A through E could make a determination that they are in a group of similar devices that is near a point of interest. One mobile device 120 could collect the individual activity and location information for sending to the server 150.

In all exemplary embodiments of the present invention, the activity information could be sent separately or along with the location information. For example, there could be a trigger just for the activity information, with the location information being sent as the result of another criteria (e.g., continuously polled or determined by the server in the absence of data sent from the mobile device).

The activity information itself could take a number of forms, such as any one or a combination of:
- time information relating to the time the mobile device was at the location associated with the location information,
- an indication that a function of the mobile device (e.g., making a call, sending a text message, and the like) is being used,
- angle information that identifies an angle of orientation of the mobile device,
- image information captured by the image capture device of the mobile device,
- other media information (e.g., video or sound data) captured by the mobile device,
- an indication that there has been a behavioral or physiological change of the user at that location (e.g., heart rate) or the level of a behavioral or physiological parameter of the user at that location,
- an indication that there has been an environmental change at the location of the mobile device (e.g., rise in temperature) or the level of an environmental parameter at that location,
- an indication that usage of the mobile device has deviated from a usage pattern associated with that usage (e.g., not following normal movement path, higher than expected call volume, and the like), and
- an indication that a predefined criteria (e.g., relating to one or more uses of the mobile device or data from one or more sensors) has been satisfied on the mobile device.

It will be appreciated that the above forms of activity information are merely exemplary and that the activity information could relate to other usages of the mobile device.

In an exemplary implementation, the location information could be sent by the mobile device 120 or could be derived by the server 150 based on data from other sources (e.g., data from access points used by the mobile device 120).

Once the server 150 has received the activity information (e.g., sent by the mobile device 120) and location information (e.g., sent by the mobile device 120 or otherwise derived from another source) associated with the mobile device 120 and determined a location of a point of interest, the server 150 can do a number of things. For example, the server 150 could tag any activity information associated with that point of interest, so that the stored activity information be can appropriately searched or categorized.

The server 150, as illustrated in FIG. 1, is located remotely from the mobile devices 120 of users A through E. For example, the server 150 could be a cloud based server accessible by the mobile device 120 over an appropriate wireless network. The details of appropriate wireless networks for communication of this type are well known, and will not be described further. Hence, in the exemplary embodiment of FIG. 1, the mobile devices 120 and the server 150 are arranged in a network of the form schematically shown in FIG. 2.

Figure 2:
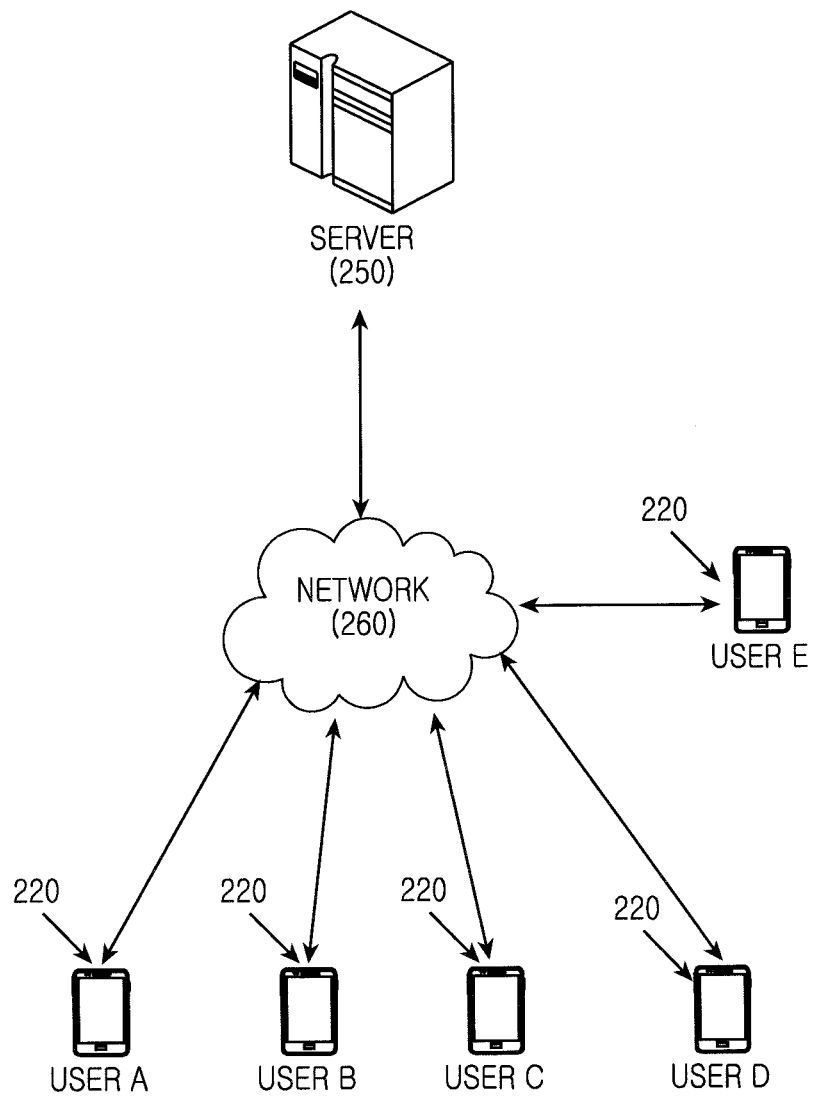
FIG. 2 illustrates a network diagram according to the first exemplary embodiment of the present invention.

FIG. 2 illustrates a network diagram according to the first exemplary embodiment of the present invention.

Referring to FIG. 2, mobile devices 220 of users A through E are in wireless communication with a remote server 250 over a network 260.

In an exemplary implementation, the remote server 250 could be a component of one of the mobile devices 220 of users A through E. For example, once a group of users A through E has been established, one of the mobile devices 220 could act as the remote server 250 for the other nearby devices. The mobile device 220 comprising the remote server 250 could collate the activity information and location information from the other devices, and act as a mobile server for the other devices.

Figure 3:
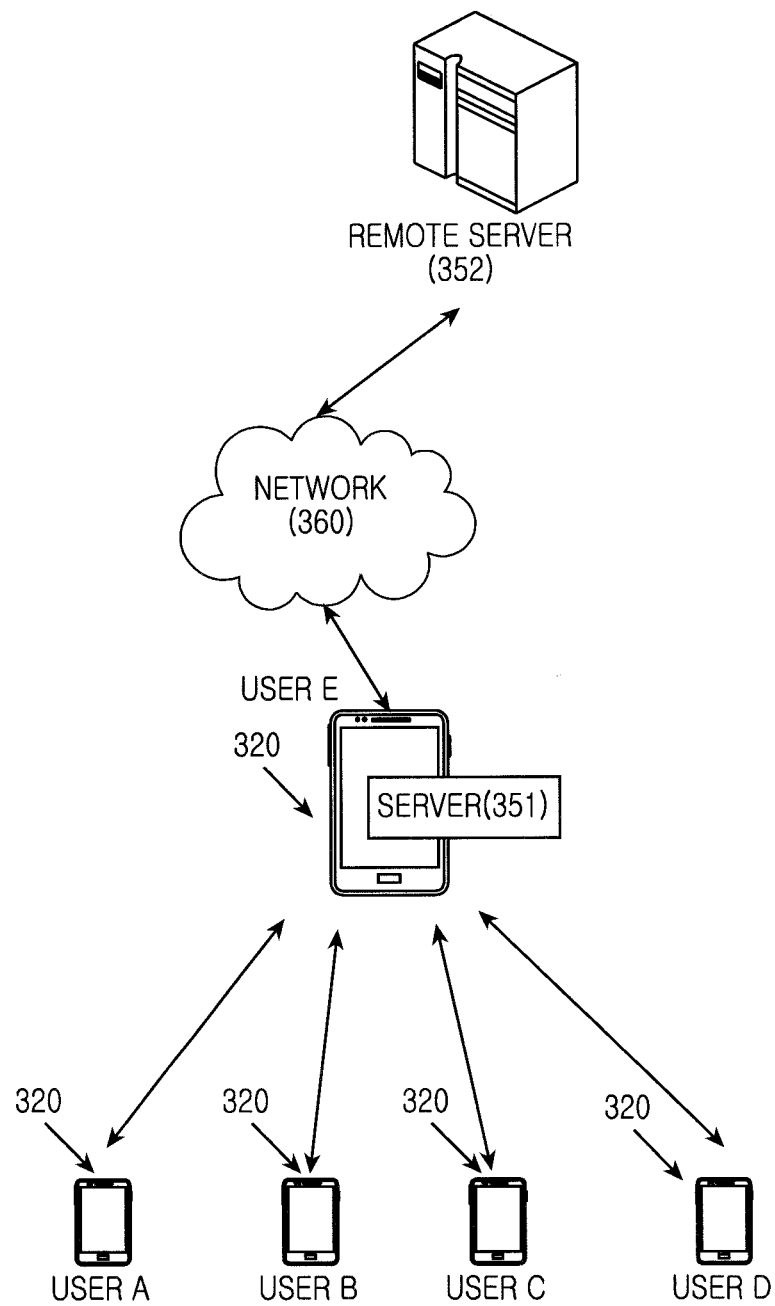
FIG. 3 illustrates a network diagram according to an exemplary embodiment of the present invention.

Hence, in some exemplary embodiments of the present invention, the mobile devices 220 and the remote server 250 are arranged in a network of the form schematically shown in FIG. 3.

FIG. 3 illustrates a network diagram according to an exemplary embodiment of the present invention.

Referring to FIG. 3, mobile devices 320 of users A through E are in wireless communication with a server 351 that forms a component of the mobile device 320 of user E.

In such exemplary embodiments of the present invention, once the server 351 that forms a component of one of the mobile devices 320 has collated all the required information, the server 351 could send the processed data to a remove server 352 over an appropriate wireless network 360.

A second exemplary embodiment of a location based system will now be described with reference to FIGS. 4A through 4C.

Figure 4A:
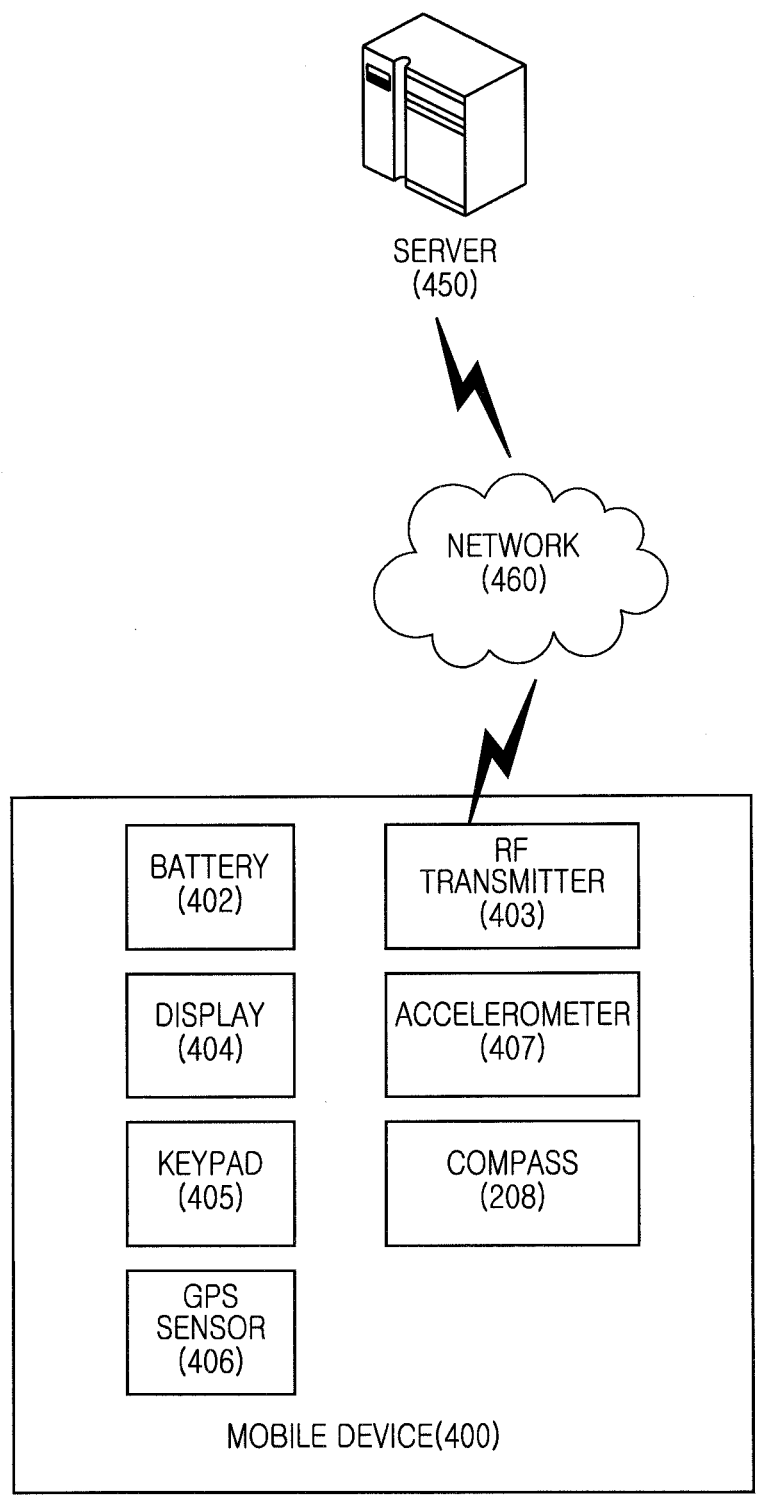
FIGS. 4A through 4C illustrate a system for identifying points of interest according to a second exemplary embodiment of the present invention.
Figure 4B:
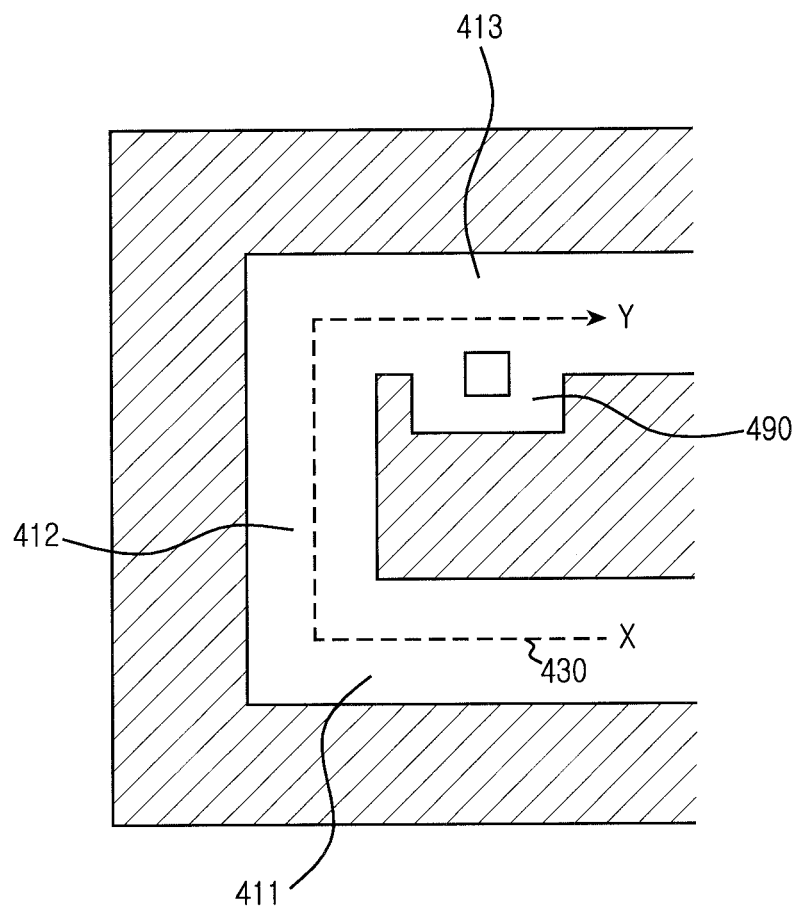
Figure 4C:
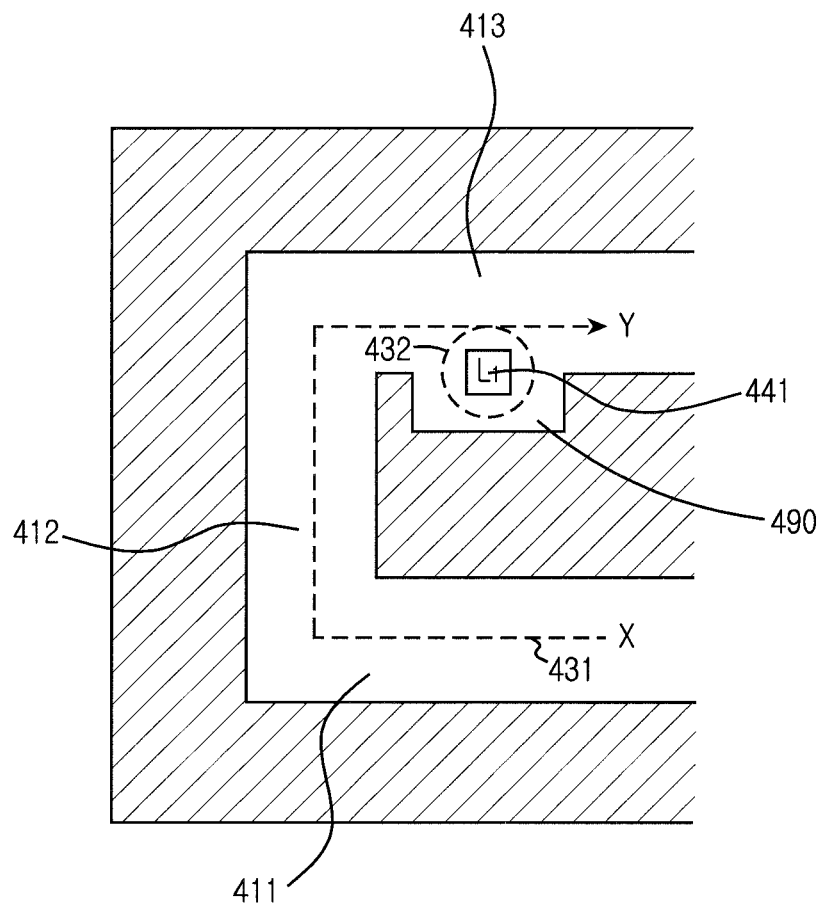

FIGS. 4A through 4C illustrate a system for identifying points of interest according to a second exemplary embodiment of the present invention.

Referring to FIG. 4A, a mobile device 400 may include a battery 402, a Radio Frequency (RF) transmitter 403, a display 404, a keypad 405, a GPS sensor 406, an accelerometer 407, and a compass 408. It will be appreciated that the mobile device 400 may be any appropriate mobile device, and may include many other functional components. The GPS sensor 406 could be referred as 'a GPS chip'. The RF transmitter 403 may perform both transmitting and receiving a signal. The keypad 405 is a user input means, and could be replaced with other input means (i.e., a touch screen). The mobile device 400 may perform a communication with a server 450 via a network 460.

Referring to FIG. 4B, a schematic layout of a floor of a building is illustrated. There is a first corridor 411, a second corridor 412, and a third corridor 413. Alongside the corridor 413 is a region 490 that forms an open space.

Referring back to FIG. 4A, the "server 450" could be located remotely from the mobile device 400. Alternatively, the "server 450" could form a logical part of another mobile device in the system, with that mobile device acting as the "server" for the other mobile devices. In other words, the network topography could take any of the forms discussed above in relation to FIG. 2 or FIG. 3. For ease of reference, the word "server" will be used in exemplary embodiments below to refer to all appropriate possibilities.

In this exemplary embodiment, the mobile device 400 sends the server 450 information regarding the location of the mobile device 400 at different times. Hence, in the situation shown in FIG. 4B, the mobile device 400 would send location data along with the time associated with that location data to the server 450. The server 450 uses this time and location data to determine that the user of the mobile device 400 normally follows a path 430 from point X to point Y.

In other words, the server 450 stores multiple sets of activity information and location information to determine a usage pattern (i.e., movement on path 430 from point X to point Y) of the mobile device in this location.

If the server 450 has stored such time and location data from the single mobile device 400 (or from a plurality of similar mobile devices), the server 450 could determine that path 430 from point X to point Y is "normal". In other words, based on previous time and location data, the server 450 could determine what would be the expected path of the mobile device 400. It will, of course, be appreciated that the stored "normal" or expected path would be associated with an error margin, so that slight deviations in the route taken by the user are ignored. This could be achieved by, for example, storing a set of "normal" paths that take into account the slight and expected route deviations a user may follow.

It will be appreciated that the location information could be based on a GPS position. Furthermore, it is possible that the GPS position would not be accurate enough, particularly inside a building, where the appropriate signal strength of the satellite signal may not be attainable. In such circumstances, the mobile device 400 could estimate its position using other ways. For example, the mobile device 400 could use its accelerometer 407 to act as a pedometer along with the compass 408 to determine the direction of travel. This information could be combined with information relating to the position of known wireless access points in communication with the device 400 or the last GPS co-ordinate to determine the starting point of the mobile device 400 (e.g., location X). The relative location from the starting point X could be derived based on the data from the accelerometer 407 and the compass 408.

FIG. 4C illustrates substantially the same floor layout, in which there is a point of interest at location L1 441.

Referring to FIG. 4C, a path of a user may take a straight line along a first corridor 411, making a right-angled turn to take a straight line path along a second corridor 412 following a path 431. However, when the user reaches the open space 490 alongside a third corridor 413, the user deviates around location L1 441, following a curved path 432. Thus, as a result of the point of interest at location L1 441, the user deviates from the normal path 430 from point X to Y shown in FIG. 4B, instead following path 431 and 432.

The deviation from the normal path 430 shown in FIG. 4B, i.e., the looped portion of path 432, could enable the server 450 to identify that something of interest is occurring at location L1 441. Hence, in this exemplary embodiment, the server 450 receives location information of the mobile device 400 in conjunction with the time of the location information. In this case, the time of the location information acts as activity information for the server 450, as the server 450 can use the time and location data to establish the usage (i.e., an activity) of the mobile device 400 in terms of the path taken from point X to Y.

In other words, in this exemplary embodiment, the receipt of location and time information from the mobile device 400 by the server 450 can enable the server 450 to build up an average path for the mobile device 400 between location X and location Y, with this average path being shown schematically in FIG. 4B as path 430. Hence, the server 450 can store multiple sets of activity information and location information to determine a usage pattern of the mobile device in this location.

In the situation shown in FIG. 4C, the server 450 can use newly received activity information and location information to determine that the usage of the mobile device deviates from the usage pattern. In this case the deviation is the looped portion 432, and this looped portion can be used to determine the location L1 441 of a point of interest.

Hence, the exemplary embodiment of FIGS. 4A through 4C could be used for a single mobile device 400 in communication with the server 450. The server 450 could receive activity information and location information from the mobile device 400 (e.g., location information associated with time) and use this to determine the location L1 441 of a point of interest based on a comparison of newly received activity information and location information (e.g., relating to path 431 and 432) and stored activity information and location information (e.g., relating to path 430).

Alternatively, it will be appreciated that the server 450 need not store activity information and location information (e.g., relating to path 430) to determine the location L1 441 of a point of interest. For example, the server 450 could be aware of the layout of the floor in FIG. 4C, and from this could estimate the expected path. The server 450 could compare the newly received activity information and location information (e.g., relating to path 431 and 432) against an expected path, to determine that there is a point of interest at location L1 441.

Furthermore, the server 450 could receive the activity information and location information relating to path 431 and 432, and from this alone, may determine that there is a point of interest at location L1 441, in the absence of any other data. The server 450 could determine from the looped portion of the path 432 alone that there is something of interest at location L1 441, simply by virtue that location L1 441 is at the center of a looped path that the user took.

In addition, it will be appreciated that in any of the above examples, the activity information and location information relating to path 431 and 432 could be supplemented with other information that would help the server 450 determine that there is a point of interest at location L1 441 (e.g., an increase in an expected call volume, taking of pictures, activation of a user input, information from sensors, and the like).

In other words, it will be appreciated that any of the various methods that the server 450 could use to determine the location of a point of interest could be combined. In general, the more such methods are used by the server, the greater the accuracy of the result. In other words, as more types of activity information are used, there will be an improvement in the precise location of the point of interest and there will be an improvement in the identification of the points of interest themselves.

Figure 5A:
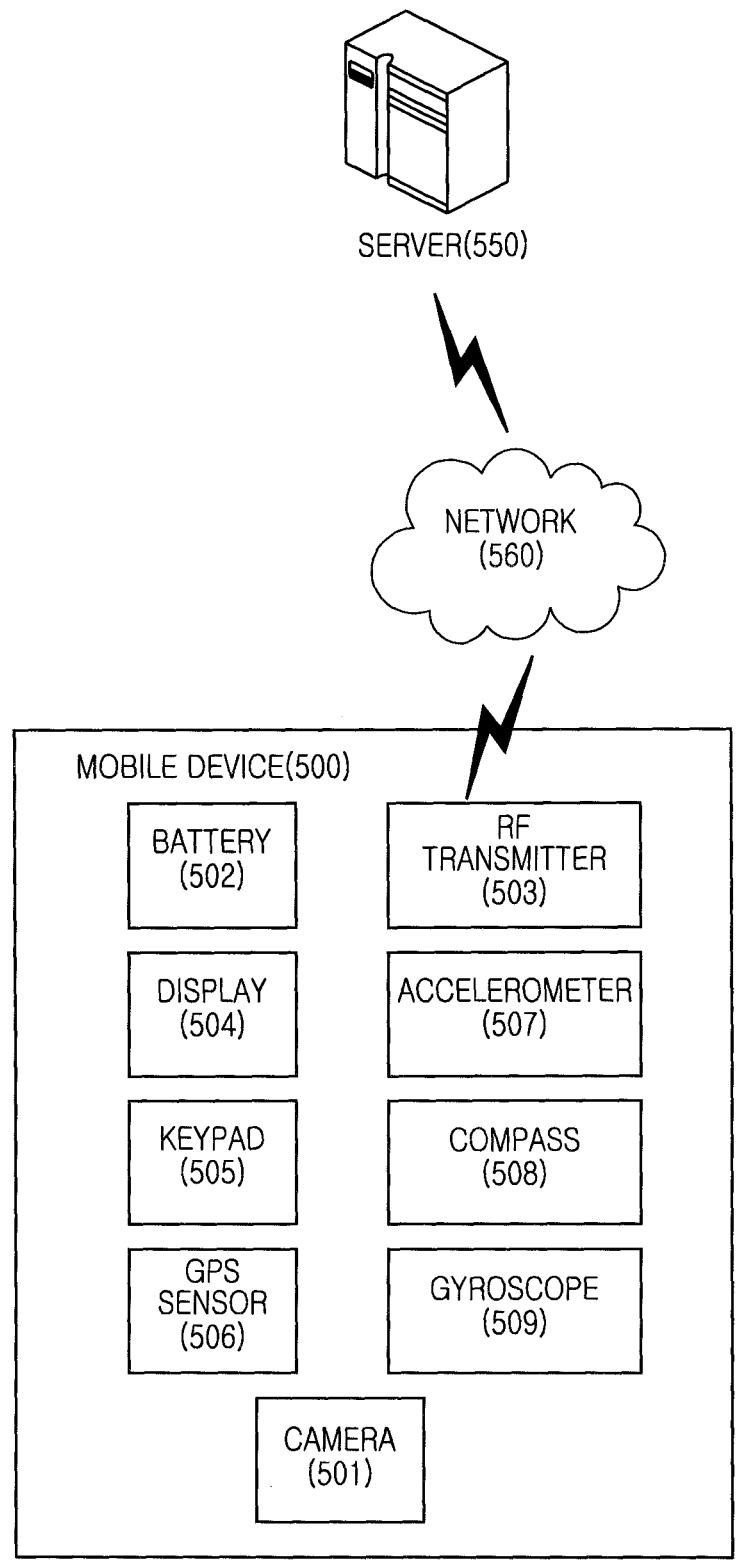
FIGS. 5A through 5C illustrate a system for identifying points of interest according to the second exemplary embodiment of the present invention.
Figure 5B:
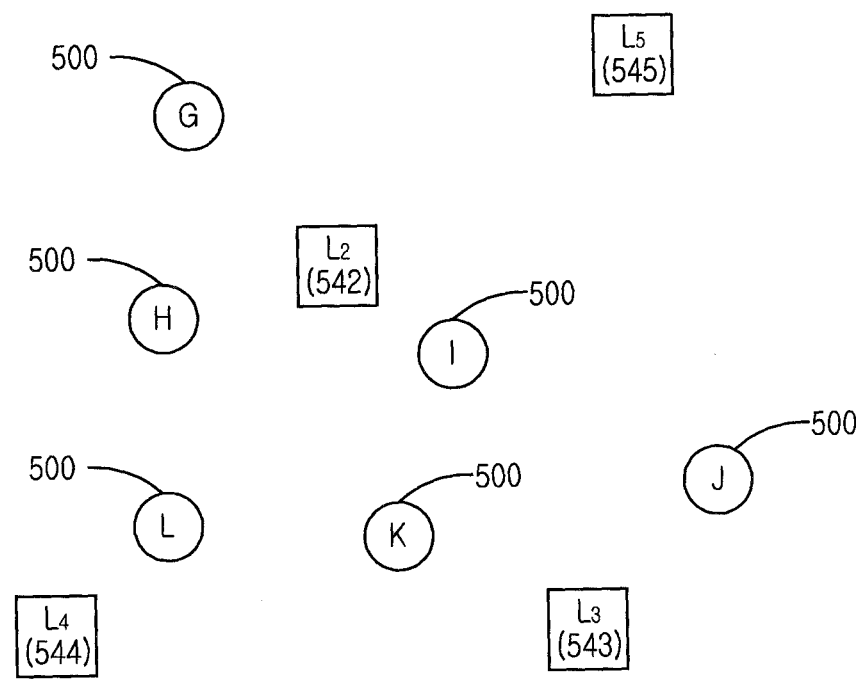
Figure 5C:
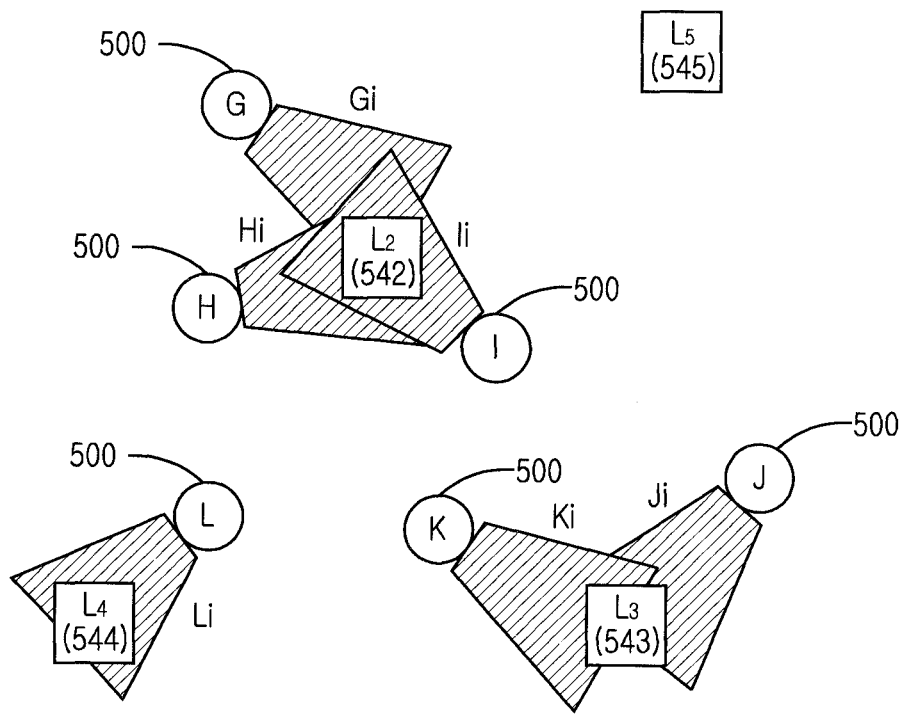

FIGS. 5A through 5C illustrate a system for identifying points of interest according to the second exemplary embodiment of the present invention.

Referring to FIG. 5A, a mobile device 500 may include a camera 501, a battery 502, an RF transmitter 503, a display 504, a keypad 505, a GPS sensor 506, an accelerometer 507, a compass 508, and a gyroscope 509. The RF transmitter 503 may perform both transmitting and receiving a signal. The keypad 505 is a user input means, and could be replaced with other input means (i.e., a touch screen). The mobile device 500 may perform a communication with a server 550 via a network 560.

In this exemplary embodiment, each of the mobile devices 500 is arranged to send image data to the server 550 along with location information using the RF transmitter 503 across the network 560.

In an image sharing system of the related art, location information (e.g., a GPS coordinate) could form part of the association with an image (e.g., an EXtended range Imaging File (EXIF) data). While this is useful for obtaining the rough location of an image, it does not identify the subject of the image. In other words, a mere GPS coordinate does not indicate the direction that the camera 501 was pointing, only the location. Hence, in a popular location for images, images will be stored in the location system in an uncategorized manner. In other words, location data alone can provide a poor indication of what the image data relates to or whether that image is of something of interest to other users.

Referring to FIG. 5B, users G through L are in substantially the same region, with each user having a mobile device 500. In this exemplary embodiment, users G, H, and I are interested in what is occurring at location L2 542, users J and K are interested in what is occurring at location L3 543 and user L is interested in what is occurring at location L4 544.

In this exemplary embodiment, each user G through L takes a picture of the locations of interest to them using the camera 501 of their respective mobile device 500. Hence, the mobile devices 500 of the users G through L capture image data.

In addition to capturing image data, each mobile device 500 establishes its location when a picture is taken. In this exemplary embodiment, this is done using the GPS sensor 506, with the location information of each mobile device 500 being a GPS coordinate. It will be appreciated, however, that the location information could take a number of forms, for example, an alternative positioning system to GPS, or a location system based on tracking information of the type discussed in relation to FIGS. 4A through 4C (e.g., based on tracking movement from a known starting point) or combinations thereof.

Furthermore, each mobile device 500 establishes the angular orientation of the device 500 at the time when a picture is taken. The angle information is obtained using the compass 508 and the gyroscope 509 of the mobile device 500. Alternatively, the angle information could be obtained by other sensors, such as light sensors, and the like.

Hence, when a picture is taken, each mobile device 500 stores image data, angle information, and location information. As a result, each mobile device 500 stores not just the image data and the location, but also the angular orientation of the device 500 when the picture was taken.

The mobile device 500 of user G through L sends image data, location information, and angle information to the server 550. The taking of a photograph is usage of the mobile device 500 that satisfies a predefined condition stored in the mobile device 500. Hence, the taking of a photograph triggers the mobile device 500 to send the activity information to the server 550. It will, of course, be appreciated that in other exemplary embodiments of the present invention, other combinations of usages of functions of the mobile device 500 could trigger the sending of activity information to the server 550.

On receipt of the image data, location information, and angle information, the server 550 can build a representation of the subjects of each photograph in the manner shown in FIG. 5C.

Referring to FIG. 5C, the fields of view of each of the users when the photograph was taken are shown. These fields of view are illustrated as "context spaces" corresponding to a 3D volume including the subject of each image taken. Each context space can be considered to be a volume, roughly in the shape of a truncated pyramid stretching from the camera outwards. The context space is established by the line of sight and field of view of the image capture device of the mobile device 500.

On receipt of the location of a mobile device 500 and the angle information, the server 550 can determine the location and the direction in which the camera 501 of that device was pointing. From this, the server 550 can determine a context space, for each set of image data. For example, the image data of user G can be calculated to have a context space Gi. Similarly, user I is calculated to have a context space Ii and user H is calculated to have a context space Hi.

These context spaces are virtual spaces used by the server 550 of this exemplary embodiment to identify points of interest. The identification of points of interest in this exemplary embodiment is based on an overlap of the context spaces of each device 500. For example, as shown in FIG. 5C, the context spaces Gi, Ii and Hi of users G, H, and I substantially overlap at location L2 542.

The overlap of the context spaces Gi, Ii and Hi of users G, H, and I enables the server 550 to identify that there is likely to be something of interest at location L2 542, as the three separate users G, H, and I have taken three overlapping views of this location L2 542 from different view points. Hence, the server 550 can use the overlap of the context spaces to determine that there is likely to be something of interest at the location L2 542 of the overlap.

Similarly, the server 550 can receive location information, angle information, and image data from users J and K and determine the context spaces Ji and Ki for the image data of users J and K. The server 550 can use this to determine that there is likely to be something of interest at location L3 543 based on the overlap of context spaces Ji and Ki.

User L is interested in what is occurring at location L4 544. Based on the illustrated users G through L alone, the server 550 may not be able to identify that location L4 544 is a point of interest that may be of interest to other users.

Hence, determining the context space of a single user may be insufficient on its own to identify that the image data taken at that time is of a general level of importance that may be of interest to other users. However, it will be appreciated that the illustrated context spaces Gi-Li are each associated with a point in time (or time range). In other words, the server 550 can determine that each of the images received from users G through L are received at a certain time (or range of times).

Therefore, while it may be the case that, in the time frame shown in FIG. 5C, there is only a single user L whose context space Li overlaps with location L4 544, at an earlier (or later) time the context spaces of many users may overlap with location L4 544. Hence, the server can use temporal averaging to build up a more accurate picture of the points of interest located in a given location.

By considering the location of overlap of context spaces (taken at substantially the same time or otherwise), the server 550 can identify a precise location of a point of interest. For example, if two users take a photograph of the same object from different vantage points, the context spaces associated with the two photographs will overlap. By receiving activity information and location information from the two users in the way described above, this overlap in the context spaces can be determined.

Once a point of interest has been identified in this way, the image data of the point of interest (identified by its context space) could be tagged or marked in an appropriate way.

Hence, when compared to image storage systems of the related art that simply store image data and location (e.g., a GPS coordinate) associated with a photograph, such exemplary embodiments of the present invention can further identity that the subject of the image (e.g., what is within the overlapping portion of the image's context space) is a point of interest. For example, the photograph could be tagged or annotated in some way at the server, to enable useful categorization of the photograph.

Furthermore, it will be appreciated that some points of interest are transient and may not persist in time. For example, if the point of interest at location L2 542 was associated with a famous person who happened to be at that location at that particular time, the overlapping context spaces Gi-Hi would not be present at a later or earlier time. The images associated with the transient point of interest at location L2 542 could be flagged as being important, enabling these images to be searched at a later time.

It will be appreciated that once the server has obtained the image data, location information, and angle information, the server 550 can use this information in a number of ways.

For example, the server 550 could use this information to enable users to browse images of different points of interest at different times. A user may request from the server 550 a view of a certain point of interest (e.g., the one shown in FIG. 5C at location L4 544) at a given time in the past. This information could be provided to the mobile device 500 of this user by the server 550.

Alternatively, the server 550 could provide such information to other devices, not just mobile devices. For example, information on the server 550 relating to points of interest could be assessable using the Internet or other such network technologies by any suitably connected device.

Once the server 550 has built up a model of the context spaces of each mobile device 500, this information could be provided to the users is a number of ways. For example, the server 550 could use this information to build up a 3D model of the area by considering the context spaces associated with each image from that area.

The server 550 could use the context spaces to build up a 3D model using a number of techniques. For example, the server 550 could build a 3D model based on the context spaces, using multiple overlapping context spaces to estimate the 3D structure of the scene. Alternatively the server 550 could map image data from mobile devices 500 as textures onto a predefined 3D model using the context spaces as a guide.

In addition, the server 550 could combine tracking data from users to establish a layout of the area (for example, in the way that path 430 shown in FIG. 4B could be used to estimate the floor layout as it corresponds to the corridor pathways) to assist in building a 3D model.

In addition, while it is appreciated that receiving image data, location information, and angle information from a plurality of mobile devices 500 is useful, the exemplary methods described above could be used in a system in which there is a single mobile device 500. For example, the location of a point of interest could be identified by consideration of overlapping context spaces taken at different times by the same mobile device 500.

Furthermore, the server 550 could collate the image data, location information, and angle information from one or more users and use this information to identify that its image coverage of a particular location has one or more gaps. An example of such a gap may be the location L5 545 shown in FIG. 5C. For example, location L5 545 could be an area of this geographic area not often photographed by users. For example, it may be that in this area, the points of interest at locations L2 542, L3 543 and L4 544 are of such interest to the users in this area, that users rarely (if ever) photograph what is occurring at location L5 545. For example, location L5 545 may correspond to a plain, uninteresting wall.

While what is occurring at location L5 545 at that time may not be of interest to the users of mobile devices 500 in the area, it may still be of interest to the server. For example, the server 550 could determine that location L5 545 is associated with a "gap" in a 3D model of the area created by the server 550. The server 550 could determine that this location is therefore a "point of interest" to the server 550. In other words the server could determine that location L5 545 is of interest to it, as it needs image data of this location to complete its 3D model. Such gaps are a barrier that needs to be overcome if a server is creating an accurate 3D model of an area.

Hence, the server 550 could use the absence of available data (i.e., a gap) at a location to determine that the location is a "point of interest". The server 550 could communicate this to users G through L of mobile devices 500, enabling the users to assist the server 550 by taking appropriate photographs of location L5 545. Hence, the server 550 could use the data available to it to identify gaps in its data coverage, which is very useful when complete data coverage is required (e.g., when preparing a 3D model).

Once a gap has been identified, the server 550 may send a request to a mobile device 500 to obtain and send image information relating to the at least one region not covered by one of the plurality of context spaces.

Hence, in the exemplary embodiments shown in FIGS. 5A through 5C, a "point of interest" identified could be a point of interest to the users of the system, or to the server 550. In either case, the server 550 uses image information and angle information in conjunction with location information to determine a context space for each mobile device 500, with the context space corresponding to a 3D volume representing a subject of the image information. The point of interest could be identified by considering areas of overlap of the context spaces of each mobile device.

Furthermore, it will be appreciated that the server 550 could use a number of other methods to assist in the determination of points of interest. For example, the image information received from a mobile device 500 could be analyzed to determine the subject of the image. There exist various methods of analyzing image data to determine the subject of the image, for example, by using contrast analysis to determine the area in focus. This additional information, in conjunction with, for example, aperture information and focal length, could be used by the server 550 to accurately determine the location of a point of interest when considering areas of overlap of the context spaces of a plurality of users.

Figure 6A:
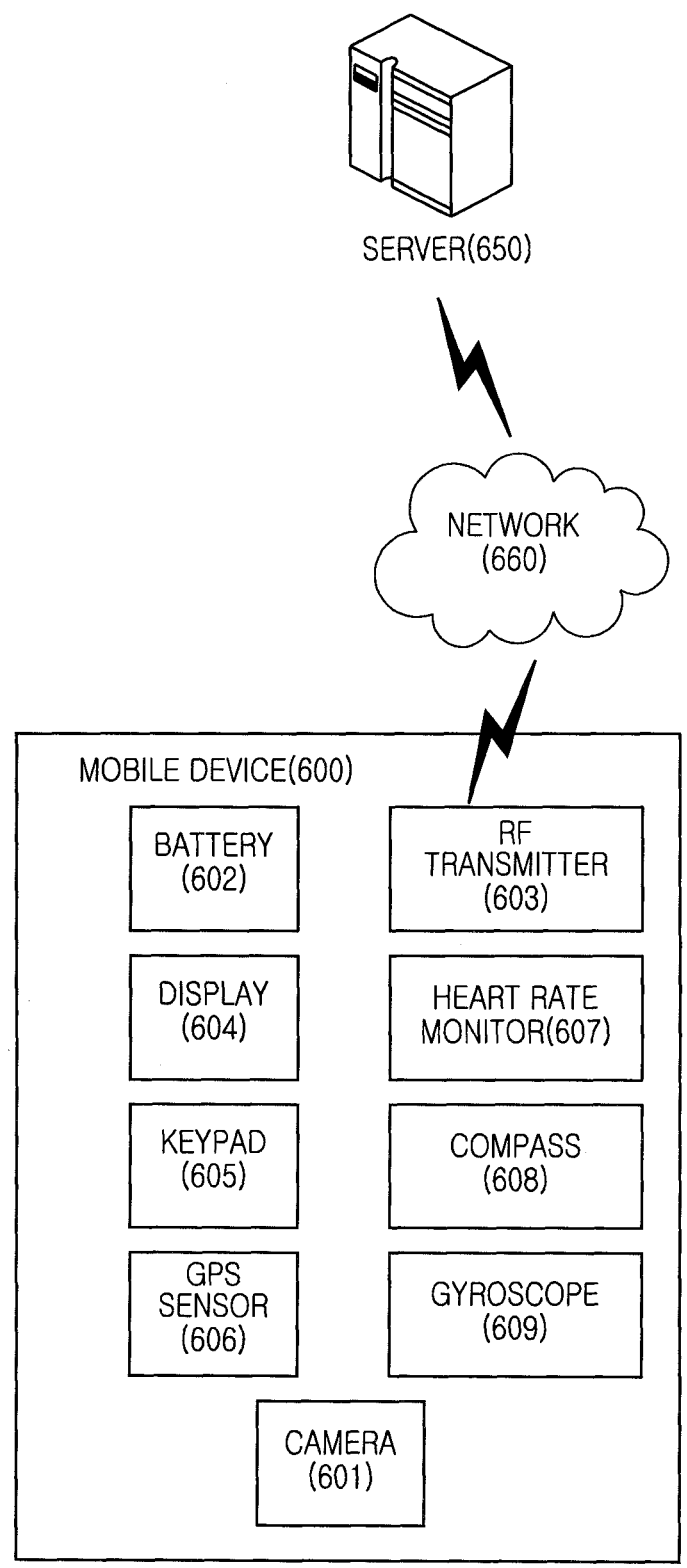
FIGS. 6A through 6C illustrate a system for identifying points of interest according to the second exemplary embodiment of the present invention.
Figure 6B:
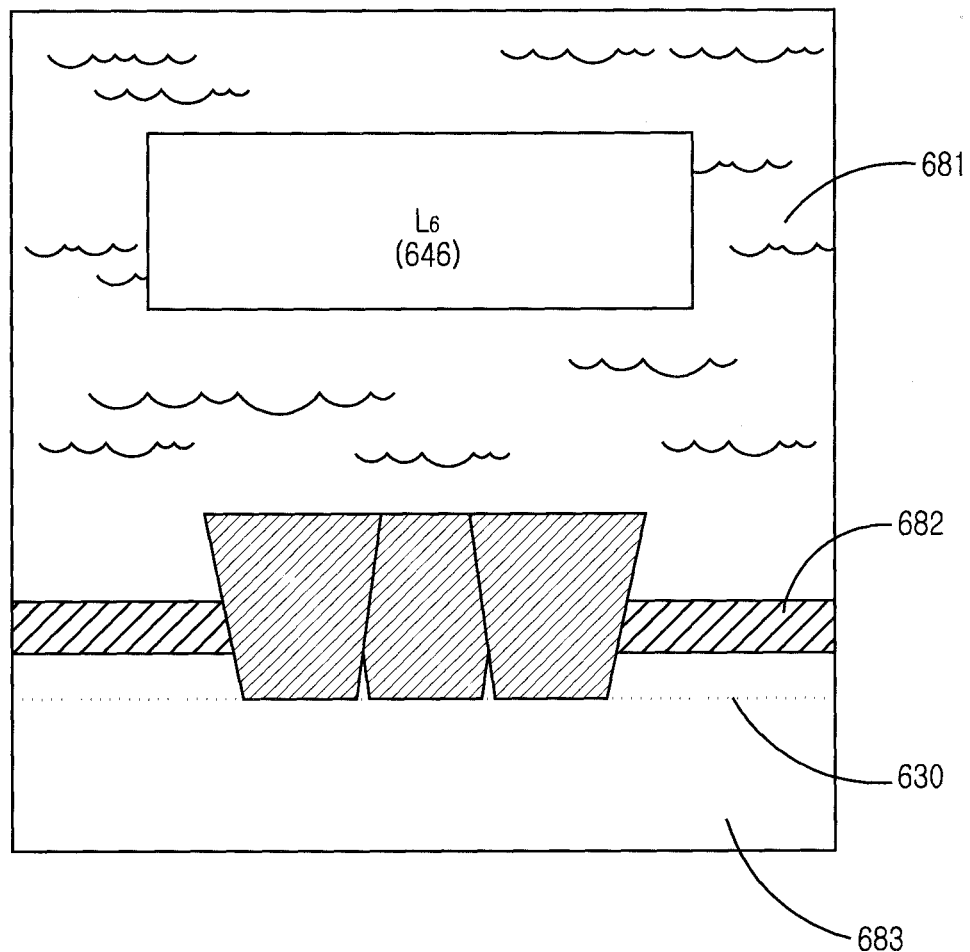
Figure 6C:
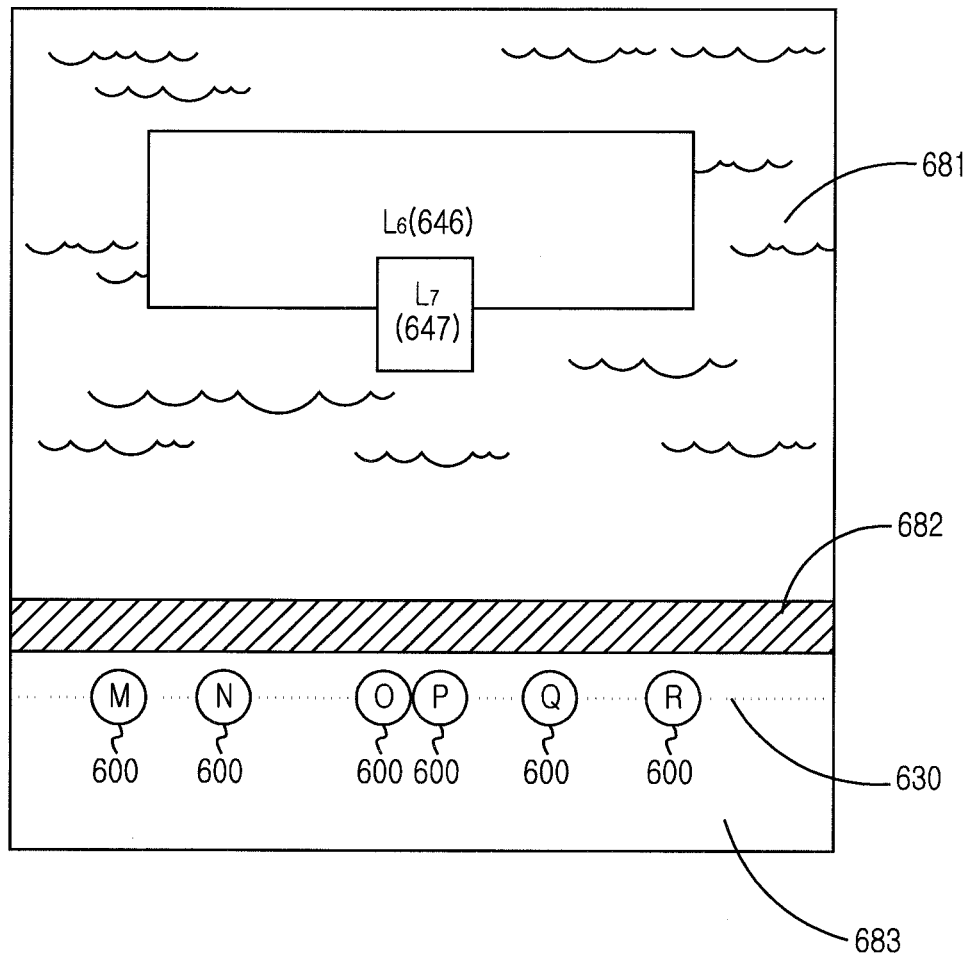

FIGS. 6A through 6C illustrate a system for identifying points of interest according to the second exemplary embodiment of the present invention.

Referring to FIG. 6A, a mobile device 600 may include a camera 601, a battery 602, an RF transmitter 603, a display 604, a keypad 605, a GPS sensor 606, a heart rate monitor 607, a compass 608, and a gyroscope 609.

The mobile device 600 is arranged to send to a server 650 image data, along with location information using the RF transmitter 603 across a network 660. The RF transmitter 603 may perform both transmitting and receiving a signal. The keypad 605 is a user input means, and could be replaced with other input means (i.e., a touch screen). The mobile device 600 may perform a communication with the server 650 via the network 660.

Referring to FIG. 6B, there is shown an area in which there is a wall 682 that separates an area of land 683 from the sea 681. Schematically shown in dotted lines is a path 630 that represents the average movement of the mobile devices 600 in this location.

The path 630 could be determined by the server 650 based on received location information from the mobile device 600 (from the GPS sensor 606 or otherwise) in the manner discussed above in relation to other exemplary embodiments, such as that described in relation to FIGS. 4A through 4C.

Location L6 646 is considered a point of interest to the majority of users in this area. For example, location L6 646 could correspond to a view out to sea that is particularly picturesque.

Given the picturesque view associated with location L6 646, if context spaces were determined by the server 650 in the manner described above for users behind wall 420, as they walk along path 630, it may be expected that these context spaces might have the pattern shown in FIG. 6B. In other words, it might be expected that all the context spaces point towards location L6 646 (three context spaces are shown for illustration), as is considered a point of interest to the majority of users in this area. This could be used to identify that location L6 646 is a point of interest, it does not help to distinguish the "normal" point of interest at location L6 646, from something particularly interesting or unusual that could be happening in this area.

Referring to FIG. 6C, an example of what may occur when something of transient interest occurs at location L7 647 is shown. For example, at a particular time period, there may be a sea rescue being carried out at location L7 647, that might be of particular interest to users of the system.

Image data of the transient point of interest at location L7 647 might be considered highly valuable to users. However, without a way of distinguishing image data of the transient point of interest at location L7 647 from image data of the fixed point of interest at location L6 646, it may be difficult for users to search for image data of the transient point of interest at location L7 647 if there was an analysis of context spaces alone.

In the snapshot of time shown in FIG. 6C, there are users M through R along path 630, with each user M through R using a mobile device 600.

Given that location L7 647 is in front of location L6 646 with respect to users M through R, and that location L6 646 is commonly the subject of photographs from users on path 630, the exemplary embodiment discussed in relation to FIGS. 5A through 5B may not be sufficient to identify the point of interest located at location L7 647 at the time of FIG. 6C. In other words, if the server 650 (not shown) received location information, angle information, and image data from users M through R, and calculated context spaces in the manner described above, this would, in the absence of further information, be similar to the temporal average of such data, in the absence of the point of interest occurring at location L7 647.

An exemplary embodiment of the present invention addresses this by sending the image data, angle information, and location information of each mobile device 600 in conjunction with further data. In this exemplary embodiment, the further data is information from the heart rate sensor 607. If the point of interest at location L7 647 is dramatic (for example, a sea rescue), this may be associated with an increase in heart rate of users M through R.

The sending of information indicating an increased heart rate along with the location information, angle information, and picture information, enables the server 650 to determine that, at the time associated with FIG. 6C, there is something of particular interest occurring. This information can be used by the server 650 to alert users that something of interest is occurring at location L7 647.

Furthermore, if a heart rate was sent with each image (along with location and angle data) to the server, the user could search the server for images taken with an elevated heart rate, possibly alerting the user to points of interest.

While FIGS. 6A through 6C have been discussed in relation to a heart rate sensor alerting the server that the pictures taken may represent a point of interest L7 647 that might not be present in the temporally averaged data, there are, of course, other ways that this information could be relayed to the server. For example, the activity information sent from the mobile device 600 could include any indication that there has been a behavioral or physiological change of the user at that location. In other words, the mobile device 600 could comprise any appropriate sensor arranged to detect a change in behavior or physiology of the user.

In addition, each of the users M through R could send their image to the server with other forms of signal indicating to the server that these pictures are of a particular interest (e.g., as a result of a user input). Alternatively, the mobile devices 600 of each of users M through R could determine via a number of other ways that something of particular interest is occurring, and relay this information to the server. For example, these mobile devices 600 could determine that they have formed a group of users M through R with a shared point of interest, and could relay that to the server.

In the above mentioned exemplary embodiments, the mobile device(s) can send information relating to usage of the mobile device to a server (or more generally a location processor). As discussed, the activity information sent by the mobile device could include data directly related to usage of the mobile device (e.g., image data or information relating to the environment of the mobile device) or could include an indication that the predefined criteria has been satisfied on the mobile device.

In this context, the predefined criteria may act as a trigger for the mobile device to send the activity information to the server. Any of the above mentioned possible usages or function of the mobile device that can form part of the activity information could form the whole or part of the predefined criteria stored on the mobile device. Hence, when one or a combination of these activities satisfies the predefined criteria, the mobile device can send the activity information (which might simply be an indication that the predefined criteria has been satisfied, or could include data relating to one or more of the activities) to the server, which can use this to determine the location of a point of interest.

As a result, any of the above exemplary embodiments above that rely on the sending of activity information that includes data directly related to usage of the mobile device (with the server using this data to determine the point of interest) could be modified so that none or only a part of this data is sent to the server, with the activity information comprising an indication that the predefined criteria has been satisfied. In other words, some exemplary embodiments rely on the mobile devices providing part of the processing required to determine the location of a point of interest.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile device for use in a contents sharing system, the mobile device comprising:
a communications interface configured to transmit, to a location processor, location information relating to a location of the mobile device, and activity information relating to a usage pattern for the mobile device at the location, and
wherein the activity information is selectively transmitted to the location processor based on a difference between the usage pattern at the location and a predetermined usage pattern corresponding to the location,
wherein the location information and the activity information are used for identifying at least one point of interest (POI) which corresponds to the location where the difference occurs.

2. The mobile device of claim 1, wherein the activity information comprises at least one of:
time information relating to the time the mobile device was at the location associated with the location information;
angle information that identifies an angle of orientation of the mobile device;
image information captured by an image capture device of the mobile device;
an indication that a user has made a user input indicating that the user considers something of interest;
an indication that there has been a behavioral or physiological change of the user;
an indication that there has been an environmental change at a location of the mobile device;
an indication that there are a plurality of users in a surrounding area;
an indication that the mobile device has deviated from a normal usage pattern; and
an indication that a predefined condition has been satisfied.

3. The mobile device of claim 1, further comprising at least one of:
an image capture device;
a sensor configured to detect a behavioral or physiological change of the user; and
a sensor configured to detect an environmental change at a location of the mobile device.

4. The mobile device of claim 1, wherein the mobile device is configured to store multiple sets of activity information and location information associated with different times to determine the predetermined usage pattern of the mobile device in the location, and, to use newly obtained activity information and location information to determine whether the usage pattern of the mobile device deviates from the predetermined usage pattern, and
wherein the activity information is transmitted to the location processor if the mobile device has deviated from the predetermined usage pattern.

5. The mobile device of claim 1, wherein the activity information is transmitted as one of a result of a user action and a result of a determination by the mobile device.

6. The mobile device of claim 1,
wherein the mobile device is configured to determine whether the activity information relates to a usage of the mobile device that satisfies a predefined condition, and
wherein the activity information is transmitted to the location processor if the usage of the mobile device satisfies the predefined condition.

7. The mobile device of claim 6, wherein the predefined condition comprises at least one of:
a usage level of one of more functions of the mobile device;
a use of at least one function of the mobile device; and
information relating to the movement of the mobile device.

8. The mobile device of claim 7, wherein the at least one function of the mobile device comprises any one or a combination of:
use of an image capture device of the mobile device;
use of a telephone call function of the mobile device;
use of a text messaging function of the mobile device;
use of a multimedia messaging service (MMS) messaging of the device; and
accessing a predefined internet service by the mobile device.

9. The mobile device of claim 7, further comprising at least one of:
a sensor configured to detect a behavioral or physiological parameter of the user; and
a sensor configured to detect an environmental parameter at the location of the mobile device.

10. The mobile device of claim 7, wherein the predefined condition is satisfied based on at least one of:
a behavioral or physiological parameter of the user at that location;
an environmental parameter at the location of the mobile device; and
whether there is a plurality of mobile devices in a surrounding area.

11. A server for use in a contents sharing system, the server comprising:
a communications interface configured to receive, from a mobile device, location information relating to a location of the mobile device, and activity information relating to a usage pattern for the mobile device at the location, wherein the activity information is selectively transmitted to the location processor if a difference between the usage pattern at the location and a predetermined usage pattern corresponding to the location; and a location processor configured to determine at least one point of interest (POI) which corresponds to the location where the difference occurs based on the activity information and the location information.

12. The server of claim 11, wherein the activity information comprises at least one of:
    time information relating to the time the mobile device was at the location associated with the location information;
    angle information that identifies an angle of orientation of the mobile device;
    image information captured by an image capture device of the mobile device;
    an indication that a user has made a user input indicating that the user considers something of interest;
    an indication that there has been a behavioral or physiological change of the user;
    an indication that there has been an environmental change at a location of the mobile device;
    an indication that there are a plurality of users in a surrounding area;
    an indication that the mobile device has deviated from a normal usage pattern; and
    an indication that a predefined condition has been satisfied.

13. The server of claim 11, wherein the at least one set of activity information and location information comprises one of:
    a plurality of different sets of activity information and location information at different times from a mobile device; and
    a plurality of different sets of activity information and location information from a plurality of mobile devices.

14. The server of claim 11, wherein the location processor is configured to:
    store multiple sets of activity information and location information from the at least one mobile device, and
    compare the stored activity information and location information with newly received activity information and location information from the mobile device in order to determine the at least one POI.

15. The server of claim 14, wherein the location processor is configured to:
    determine the predetermined usage pattern of the at least one mobile device in the location based on the stored multiple sets of activity information and location information, to use the newly received activity information and location information to determine whether the usage pattern of the mobile device deviates from the predetermined usage pattern, and
    determine the location of the at least one POI based on a deviation from the predetermined usage pattern.

16. The server of claim 15, wherein the normal usage pattern of the mobile device relates to at least one of:
    an expected movement path of the mobile device in the location;
    an expected call volume;
    an expected text messaging activity; and
    an expected data usage.

17. The server of claim 12, wherein the location processor is configured to:
    use the image information and angle information to determine a context space for each set of activity information and location information,
    each context space representing a 3 Dimensional (3D) volume associated with the image information,
    determine whether there is an overlap of any of the plurality of the context spaces, and
    determine the at least one POI based on a location of overlap.

18. The server of claim 17, wherein the location processor is configured to:
    use the context spaces to determine at least one region that is not covered by any one of the context spaces, and
    transmit a request for providing image information relating to the at least one region not covered to at least one mobile device.

19. The server of claim 11, wherein the location processor is configured to transmit information relating to the at least one POI to the at least one mobile device.

20. The server of claim 11, wherein the location processor is configured to tag the activity information with an indication that it is associated with the determined POI.

21. A method for using a mobile device in a contents sharing system, the method comprising:
    transmitting, to a location processor, location information relating to a location of the mobile device, and activity information relating to a usage pattern for the mobile device at the location processor,
    wherein the activity information is selectively transmitted to the location processor based on a difference between the usage pattern at the location and a predetermined usage pattern corresponding to the location, and
    wherein the location information and the activity information are used for identifying at least one point of interest (POI) which corresponds to the location where the difference occurs.

22. The method of claim 21, wherein the activity information comprises at least one of:
    time information relating to the time the mobile device was at the location associated with the location information;
    angle information that identifies an angle of orientation of the mobile device;
    image information captured by an image capture device of the mobile device;
    an indication that a user has made a user input indicating that the user considers something of interest;
    an indication that there has been a behavioral or physiological change of the user;
    an indication that there has been an environmental change at a location of the mobile device;
    an indication that there are a plurality of users in a surrounding area;
    an indication that the mobile device has deviated from a normal usage pattern; and
    an indication that a predefined condition has been satisfied.

23. The method of claim 21, further comprising at least one of:
    capturing an image;
    detecting a behavioral or physiological change of the user; and
    detecting an environmental change at a location of the mobile device.

24. The method of claim 21, further comprising:
storing multiple sets of activity information and location information associated with different times to determine the predetermined usage pattern of the mobile device in the location; and
using newly obtained activity information and location information to determine whether the usage pattern of the mobile device deviates from the predetermined usage pattern,
wherein the activity information is transmitted to the location processor when the mobile device has deviated from the predetermined usage pattern.

25. The method of claim 21, wherein the activity information is transmitted as one of a result of a user action and a result of a determination by the mobile device.

26. The method of claim 21, further comprising:
determining whether the activity information relates to a usage of the mobile device that satisfies a predefined condition,
wherein the activity information is transmitted to the location processor if the usage of the mobile device satisfies the predefined condition.

27. The method of claim 26, wherein the predefined condition comprises at least one of:
a usage level of one of more functions of the mobile device;
a use of at least one function of the mobile device; and
information relating to the movement of the mobile device.

28. The method of claim 27, wherein the at least one function comprises any one or a combination of:
use of an image capture device of the mobile device;
use of a telephone call function of the mobile device;
use of a text messaging function of the mobile device;
use of a multimedia messaging service (MMS) messaging of the device; and
accessing a predefined internet service by the mobile device.

29. The method of claim 27, further comprising at least one of:
detecting a behavioral or physiological parameter of the user; and
detecting an environmental parameter at the location of the mobile device.

30. The method of claim 27, wherein the predefined condition is satisfied based on at least one of:
a level of a behavioral or physiological parameter of the user at that location;
a level of an environmental parameter at the location of the mobile device; and
whether there is a plurality of mobile devices in a surrounding area.

31. A method for using a server in a contents sharing system, the method comprising:
receiving, from a mobile device, location information relating to a location of the mobile device, and activity information relating to a usage pattern for the mobile device at the location,
wherein the activity information is selectively transmitted to the location processor based on a difference between the usage pattern at the location and a predetermined usage pattern corresponding to the location; and
determining at least one point of interest (POI) which corresponds to the location where the difference occurs based on the activity information and the location information.

32. The method of claim 31, wherein the activity information comprises at least one of:
time information relating to the time the mobile device was at the location associated with the location information;
angle information that identifies an angle of orientation of the mobile device;
image information captured by an image capture device of the mobile device;
an indication that a user has made a user input indicating that the user considers something of interest;
an indication that there has been a behavioral or physiological change of the user;
an indication that there has been an environmental change at a location of the mobile device;
an indication that there are a plurality of users in a surrounding area;
an indication that the mobile device has deviated from a normal usage pattern; and
an indication that a predefined condition has been satisfied.

33. The method of claim 31, wherein the at least one set of activity information and location information comprises one of:
a plurality of different sets of activity information and location information at different times from a mobile device; and
a plurality of different sets of activity information and location information from a plurality of mobile devices.

34. The method of claim 31, wherein the determining of the at least one POI comprises:
storing multiple sets of activity information and location information from the at least one mobile device; and
comparing the stored activity information and location information with newly received activity information and location information from the mobile device in order to determine the at least one POI.

35. The method of claim 34, wherein the determining of the at least one POI comprises:
determining the predetermined usage pattern of the at least one mobile device in the location based on the stored multiple sets of activity information and location information;
using the newly received activity information and location information to determine whether the usage pattern of the mobile device deviates from the predetermined usage pattern; and
determining the at least one POI based on a deviation from the predetermined usage pattern.

36. The method of claim 35, wherein the normal usage pattern of the mobile device relates to at least one of:
an expected movement path of the mobile device in the location;
an expected call volume;
an expected text messaging activity; and
an expected data usage.

37. The method of claim 32, wherein the determining of the at least one POI comprises:
using the image information and angle information to determine a context space for each set of activity information and location information, each context space representing a 3 Dimensional (3D) volume associated with the image information;
determining whether there is an overlap of any of the context spaces; and
determining the at least one POI based on a location of overlap.

38. The method of claim 37, wherein the determining of the at least one POI comprises:
using the context spaces to determine at least one region that is not covered by one of the context spaces; and
transmitting a request for providing image information relating to the at least one region not covered to at least one mobile device.

39. The method of claim 31, further comprising:
transmitting information relating to the at least one POI to the at least one mobile device.

40. The method of claim 31, further comprising:
tagging the activity information with an indication that it is associated with the determined POI.

* * * * *